United States Patent
Kanzian et al.

(10) Patent No.: US 10,128,752 B1
(45) Date of Patent: Nov. 13, 2018

(54) CONTROLLER TUNING USING PERTURBATION SEQUENCE

(71) Applicant: Infineon Technologies AG, Neubiberg (DE)

(72) Inventors: Marc Kanzian, Wernberg (AT); Andreas Berger, Klagenfurt (AT); Harald Gietler, Villach (AT); Stefano Marsili, Faak am See (AT); Robert Priewasser, Villach (AT); Christoph Unterrieder, Rothenthurn (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/847,349

(22) Filed: Dec. 19, 2017

(51) Int. Cl.
*H02M 3/157* (2006.01)
*H02M 1/00* (2006.01)

(52) U.S. Cl.
CPC .... *H02M 3/157* (2013.01); *H02M 2001/0025* (2013.01)

(58) Field of Classification Search
CPC .............. H02M 3/157; H02M 2001/0025
See application file for complete search history.

(56) References Cited

U.S. PATENT DOCUMENTS

| 9,610,858 | B2 * | 4/2017 | Shao .................. B60L 11/14 |
| 2010/0141230 | A1 | 6/2010 | Lukic et al. |
| 2014/0372056 | A1 | 12/2014 | Lunglmayr et al. |
| 2017/0063253 | A1 * | 3/2017 | Fukumaru ............ H02P 21/13 |
| 2017/0317576 | A1 * | 11/2017 | Shen ..................... H02M 1/083 |
| 2018/0006588 | A1 * | 1/2018 | Magee .................. H02P 6/181 |

OTHER PUBLICATIONS

Corradini, et al., "Digital Control of High-Frequency Switched-Mode Power Converters," John Wiley & Sons, 2015, 357 pp.
Gietler, et al., "Low-complexity, high frequency parametric system identification method for switched-mode power converters," In Proceedings of IEEE Applied Power Electronics Conference and Exposition (APEC'2017), 2004-2009, Mar. 2017, 6 pp.

(Continued)

*Primary Examiner* — Kyle J Moody
(74) *Attorney, Agent, or Firm* — Shumaker & Sieffert, P.A.

(57) ABSTRACT

In an example, a device for operating a switching converter is configured to determine a set of perturbed duty cycle values for a converter. A perturbation sequence is superimposed simultaneously onto a duty cycle value for each phase of the converter to form the set of perturbed duty cycle values. The device is further configured to determine an output voltage of the converter that occurs when the converter operates based on the set of perturbed duty cycle values, determine a coefficient vector of system parameters for the converter based on the output voltage and the set of perturbed duty cycle values, and tune a controller based on the coefficient vector. The duty cycle value for each phase of the converter is based on a respective command duty cycle value of a set of command duty cycle values output by the controller.

20 Claims, 15 Drawing Sheets

(56) References Cited

OTHER PUBLICATIONS

Miao, et al., "System identification of power converters with digital control through cross-correlation methods," IEEE Transactions on Power Electronics, 20(5): pp. 1093-1099, Sep. 2005.
Priewasser, et al., "Modeling, control, and implementation of dc-dc converters for variable frequency operation," IEEE Transactions on Power Electronics, 29(1):287-301, Jan. 2014.
Gordillo, "A Simple Sensorless Current Sharing Technique for Multiphase DC-DC Buck Converters," In IEEE Transactions on Power Electronics, vol. 32, No. 5, pp. 3480-3489, May 2017.
Algreer, et al., "Active online system identification of switch mode dc-dc power converter based on efficient recursive dcd-iir adaptive filter," IEEE Transactions on Power Electronics, 27(11):4425-4435, Nov. 2012.
Stefanutti, et al., "Autotuning of digitally controlled dc-dc converters based on relay feedback," IEEE Transactions on Power Electronics, 22(1):199-207, Jan. 2007.
Foley, "Sensorless Current Estimation and Sharing in Multiphase Buck Converters," In IEEE Transactions on Power Electronics, vol. 27, No. 6, pp. 2936-2946, Jun. 2012.

\* cited by examiner

CONTROLLER TUNING USING PERTURBATION SEQUENCE

TECHNICAL FIELD

This disclosure relates to converters, such as DC-DC power converter circuits.

BACKGROUND

Power converters may be used to generate an output power signal by converting one or more aspects of an input power signal. As one example, a DC-DC power converter may convert an input DC power signal at a first voltage level into an output DC power signal at a second voltage level. As another example, an AC-DC power converter may rectify an input AC power signal into an output DC power signal. As yet another example, a DC-AC power converter may invert an input DC power signal into an output AC power signal. In some examples, a power converter may include multiple stages. For instance, a power converter may include a DC-DC stage and a DC-AC stage.

SUMMARY

This disclosure describes techniques for tuning a power converter using a perturbation sequence. A system identification module may inject the perturbation sequence (e.g., a sequence with an approximately Dirac shaped autocorrelation function) to estimate a natural frequency of the power converter. The estimated natural frequency may be used to tune a controller for the power converter to improve a dynamic performance of the power converter. For example, a control module may multiply each gain of a proportional-integral-derivative (PID) controller and a respective correction factor that is calculated using the estimate natural frequency to improve the dynamic performance of the power converter. Moreover, the perturbation sequence used for finding the estimated natural frequency may be further used to current balance different phases of the power converter.

In some examples, this disclosure describes a device for operating a switching converter. The device is configured to determine a set of perturbed duty cycle values for a converter. A perturbation sequence is superimposed simultaneously onto a duty cycle value for each phase of the converter to form the set of perturbed duty cycle values. The device is further configured to determine an output voltage of the converter that occurs when the converter operates based on the set of perturbed duty cycle values. The device is further configured to determine a coefficient vector of system parameters for the converter based on the output voltage and the set of perturbed duty cycle values. The device is further configured to tune a controller based on the coefficient vector. The duty cycle value for each phase of the converter is based on a respective command duty cycle value of a set of command duty cycle values output by the controller.

In some examples, this disclosure describes a method for operating a switching converter, the method comprising determining, by processing circuitry, a set of perturbed duty cycle values for a converter. A perturbation sequence is superimposed simultaneously onto a duty cycle value for each phase of the converter to form the set of perturbed duty cycle values. The method further includes determining, by the processing circuitry, an output voltage of the converter that occurs when the converter operates based on the set of perturbed duty cycle values. The method further includes determining, by the processing circuitry, a coefficient vector of system parameters for the converter based on the output voltage and the set of perturbed duty cycle values. The method further includes tuning, by the processing circuitry, a controller based on the coefficient vector. The duty cycle value for each phase of the converter is based on a respective command duty cycle value of a set of command duty cycle values output by the controller.

In some examples, this disclosure describes a system comprising a voltage source, a converter configured to receive power from the voltage source and to generate an analog output voltage, an analog-to-digital converter configured to convert an indication of the analog output voltage into an output voltage suitable for use by a control module, a stimuli generator configured to generate a perturbation sequence, a control module comprising a controller configured to generate a plurality of command duty cycle values, and a system identification module. The control module is configured to generate a duty cycle value for each phase of the converter based on the plurality of command duty cycle values. The perturbation sequence is superimposed simultaneously onto the duty cycle value for each phase of the converter to form a plurality of perturbed duty cycle values. The control module is further configured to generate a switching signal based on the plurality of perturbed duty cycle values for the converter. The converter generates the analog output voltage based on the switching signal. The system identification module is configured to determine the output voltage of the converter that occurs when the converter operates based on the switching signal, generate a coefficient vector of system parameters for the converter based on the output voltage that occurs when the converter operates based on the switching signal and the plurality of perturbed duty cycle values, and tune the controller based on the coefficient vector.

The details of one or more examples are set forth in the accompanying drawings and the description below. Other features, objects, and advantages will be apparent from the description and drawings, and from the claims.

DETAILED DESCRIPTION

Figure 1:
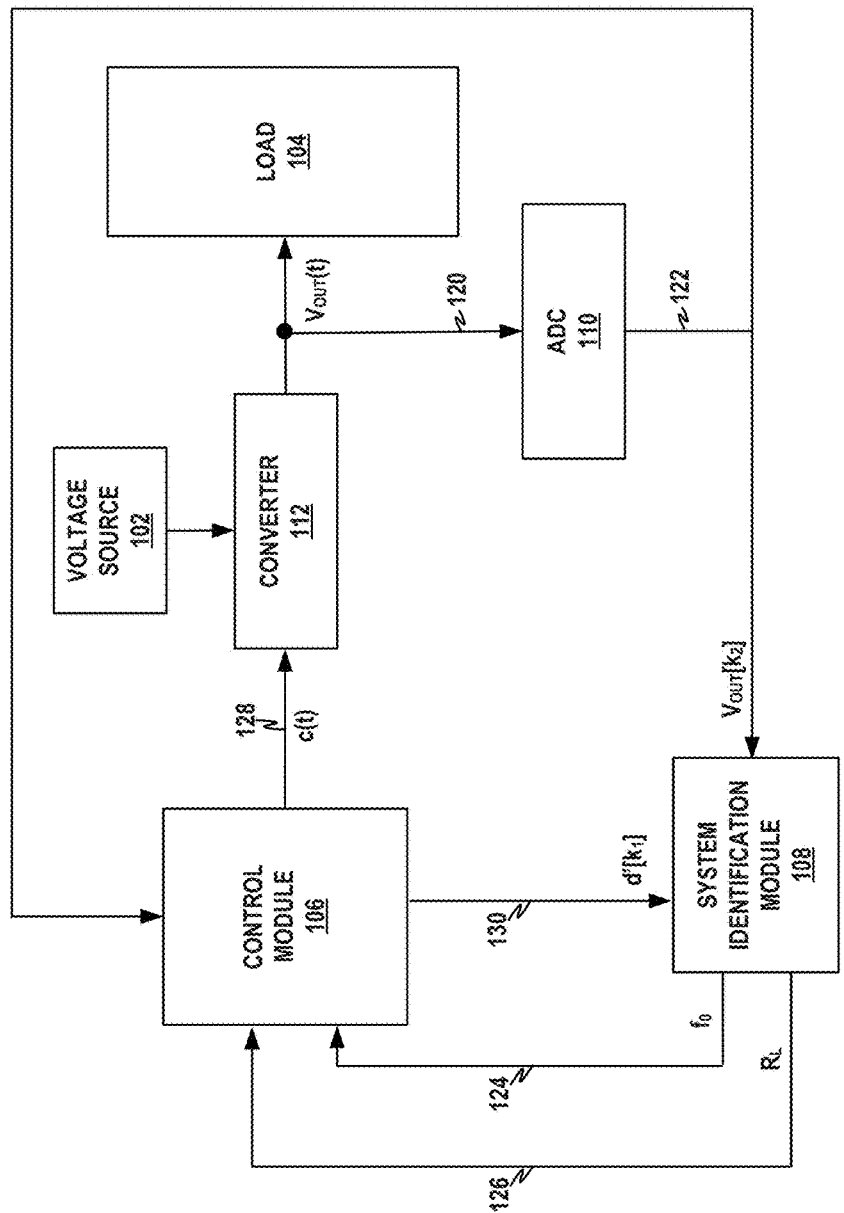
FIG. 1 is a block diagram illustrating an example system configured for controller tuning using a perturbation sequence, in accordance with one or more techniques of this disclosure.

This disclosure is directed to an identification (online or offline) of system properties of power converters (e.g., DC-DC converters) based on measurements taken from the system. Furthermore, "online identification" in this context may refer to system identification (SI) techniques that are applied during a runtime of the system (e.g. during start-up mode or normal operation mode).

Along with the growing number of electronic devices, the demand for switched-mode power supplies (SMPSs) providing high efficiency and a well-regulated output voltage is rising. Because the SMPS's performance influences the operating range, stability and efficiency of the system, sophisticated control algorithms are frequently used. Control algorithms may be found at Luca Corradini, Dragan Maksimovi'c, Paolo Mattavelli, and Regan Zane. Digital Control of High-Frequency Switched-Mode Power Converters. John Wiley & Sons, 2015, R. Priewasser, M. Agostinelli, C. Unterrieder, S. Marsili, and M. Huemer. Modeling, control, and implementation of dc-dc converters for variable frequency operation. IEEE Transactions on Power Electronics, 29(1):287-301, January 2014, and elsewhere.

Due to component tolerances, the controller is typically designed to cover a wide range of parameter values. Additionally, in applications that support various externals, such as different inductor and capacitor configurations, the parameter range typically covered by the controller increases even further. To ensure stability of the converter in all operating conditions and over all possible parameter variations the controller is typically designed in a very conservative way, which degrades the dynamic performance (e.g. when operating in nominal conditions) and increases the cost of external components. In contrast, system identification enables the tracking of the operating conditions and parameter variations, which allows self-tuning of the controller. Hence, the controller may be tuned accordingly, such that the system performance fulfills the specification limits over the parameter space while stability is maintained.

Online system identification concepts may be used for estimating the parameters of a converter. In online system identification concepts, the steady state duty cycle is superimposed by a disturbance, which is used in conjunction with the resulting output voltage perturbation to estimate the system parameters. The downsides may include high computational complexity, high memory usage, and introduced uncertainties due to the assumption of a fixed SMPS model. As such, on-chip implementations are often still not feasible due to the amount of operations and the duration of the stimulus injection.

One or more examples described herein may use a mathematical description of the system as well as measurements from the system in order to estimate the following system characteristics: coefficients of transfer functions or state-space models and frequency response of the system. Furthermore, based on the system identification, the following objectives may be achieved: automatic tuning of the controller and balancing for multi-phase converters. By tuning the controller based on the system identification, the performance of the system is improved, without sacrificing stability.

Regarding the balancing for multi-phase converters, multi-phase (or interleaved) DC-DC converters may be employed in order to improve the efficiency of the power conversion at higher loads. Advantages of interleaving is the increased effective switching frequency of the converter, which results in lower output current and voltage ripple and the reduction of the DC current value for each phase (allowing the use of lower-rated/cheaper components such as switches and passives). However, a current balancing loop is typically needed to ensure that the load current is equally split between the phases, since mismatches in the components of the phases (e.g. parasitic resistances) cause a difference in the current through the phases. In some systems, current sensing is used to obtain, for example, equal current sharing. With one or more techniques described herein, current sharing may be achieved without current sensing, thus reducing the implementation complexity and costs (e.g., component count).

FIG. 1 is a block diagram illustrating an example system 100 configured for controller tuning using a perturbation sequence, in accordance with one or more techniques of this disclosure. As shown system 100 includes voltage source 102, load 104, control module 106, system identification module 108, analog-to-digital converter 110 (also referred to herein as "ADC"), and converter 112. System 100 may include additional components.

Voltage source 102 may be configured to provide electrical power to one or more other components of system 100. For instance, voltage source 102 may be configured to supply an input power to load 104. In some examples, voltage source 102 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, voltage source 102 may be an output of a power converter. For instance, voltage source 102 may be an output of a direct current (DC) to DC power converter, an alternating current (AC) to DC power converter, and the like. In some examples, voltage source 102 may represent a connection to an electrical supply grid. In some examples, the input power signal provided by voltage source 102 may be a DC input power signal. For instance, voltage source 102 may be configured to provide a DC input power signal in the range of ~5 VDC to ~40 VDC.

Load 104 may be any suitable device configured to use power output by converter 112. In some examples, load 104 may include an electronic device. Examples of electronic devices may include, but are not limited to, mobile devices (e.g., smart phones, tablets, wearable devices, or another mobile device), computing devices (e.g., laptop, notebook, portable personal computer, or another computing device), batteries (e.g., nickel-cadmium, lead-acid, nickel-metal hydride, nickel-zinc, silver-oxide, lithium-ion, lithium polymer, or another battery), speakers, or another electronic device.

ADC 110 may be configured to receive an indication of voltage 120, which is in an analog form output by converter 112. In this example, ADC 110 may be configured to generate output voltage 122 to be suitable for use by control module 106. For instance, ADC 110 may generate output voltage 122 in a digital form. In some examples, ADC 110 may be configured to generate output voltage 122 to be suitable for use by system identification module 108.

Converter 112 may be configured to receive power from voltage source 102 and output power suitable for use by load 104. Converter 112 may include switching converters, or other converters. Examples of switching converters may include, but are not limited to, flyback, buck-boost, buck, Ćuk, or another switch-mode power converter. In some examples, converter 112 may receive a voltage and output a voltage that is different from the received voltage. For instance, converter 112 may receive a battery voltage from voltage source 102 and output a regulated first voltage that is less than the battery voltage. More specifically, in some examples, converter 112 may be a buck converter that bucks (e.g., reduces) a battery voltage received from voltage source 102 to a regulated output voltage.

Converter 112 may include one or more switching elements (e.g., a high side switching element, a low side switching element, etc.), and one or more converter components. Converter components may include energy storage elements (e.g., capacitors, inductors, etc.), resistive elements, and other converter components that are selectively switched one or more switching elements.

As used herein, switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that switching elements may be voltage-controlled and/or current-controlled. Examples of current-controlled switching elements may include, but are not limited to, gallium nitride (GaN) MOSFETs, BJTs, or other current-controlled elements. Similarly, switching elements may include, but are not limited to, silicon controlled rectifier (SCR), a Field Effect Transistor (FET), and bipolar junction transistor (BJT). It should be understood that switching elements may be voltage-controlled and/or current-controlled. In some examples, a switching element may be a diode.

Converter 112 may activate based on the perturbed duty cycle values ("d'[$k_1$]"). For example, a pulse-width modulator of control module 106 may generate switching signal 128 ("c(t)") based on the perturbed duty cycle values ("d'[$k_1$]").

Control module 106 may control converter 112 to output a voltage and/or current to load 104. For instance, control module 106 may regulate a voltage and/or current at load 104 using output voltage 122. In some examples, control module 106 may include an analog circuit. In some examples, control module 106 may be a microcontroller on a single integrated circuit containing a processor core, memory, inputs, and outputs. For example, control module 106 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, control module 106 may be a combination of one or more analog components and one or more digital components.

System identification module 108 may be configured to estimate a natural frequency or coefficient vector of converter 112 to tune control module 106. In some examples, system identification module 108 may include an analog circuit. In some examples, system identification module 108 may be a microcontroller on a single integrated circuit containing a processor core, memory, inputs, and outputs. For example, system identification module 108 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, system identification module 108 may be a combination of one or more analog components and one or more digital components.

In accordance with one or more techniques described herein, system identification module 108 may be configured to determine a plurality of perturbed duty cycle values for a multi-phase converter. For example, system identification module 108 may receive the perturbed duty cycle values 130 from control module 106. In this example, a perturbation sequence is superimposed simultaneously onto a duty cycle value for each phase of converter 112 to form perturbed duty cycle values 130.

System identification module 108 may determine an output voltage of converter 112 that occurs when converter 112 operates based on the perturbed duty cycle values. For example, system identification module 108 may receive an output voltage 122 from ADC 110. System identification module 108 may generate a coefficient vector of system parameters for converter 112 based on the output voltage and the perturbed duty cycle values. System identification module 108 may estimate natural frequency values for converter 112 based on the coefficient vector. System identification module 108 may tune control module 106 based on natural frequency values 124 or the coefficient vector.

Moreover, in some examples, system identification module 108 may estimate phase resistance values for converter 112 based on the coefficient vector and current balance each phase of converter 112 based on the phase resistance values. For example, system identification module 108 may output phase resistance values or values proportional to phase resistance values 126 to control module 106, which may modify respective duty cycles of converter 112 to current balance each phase of converter 112.

Figure 2:
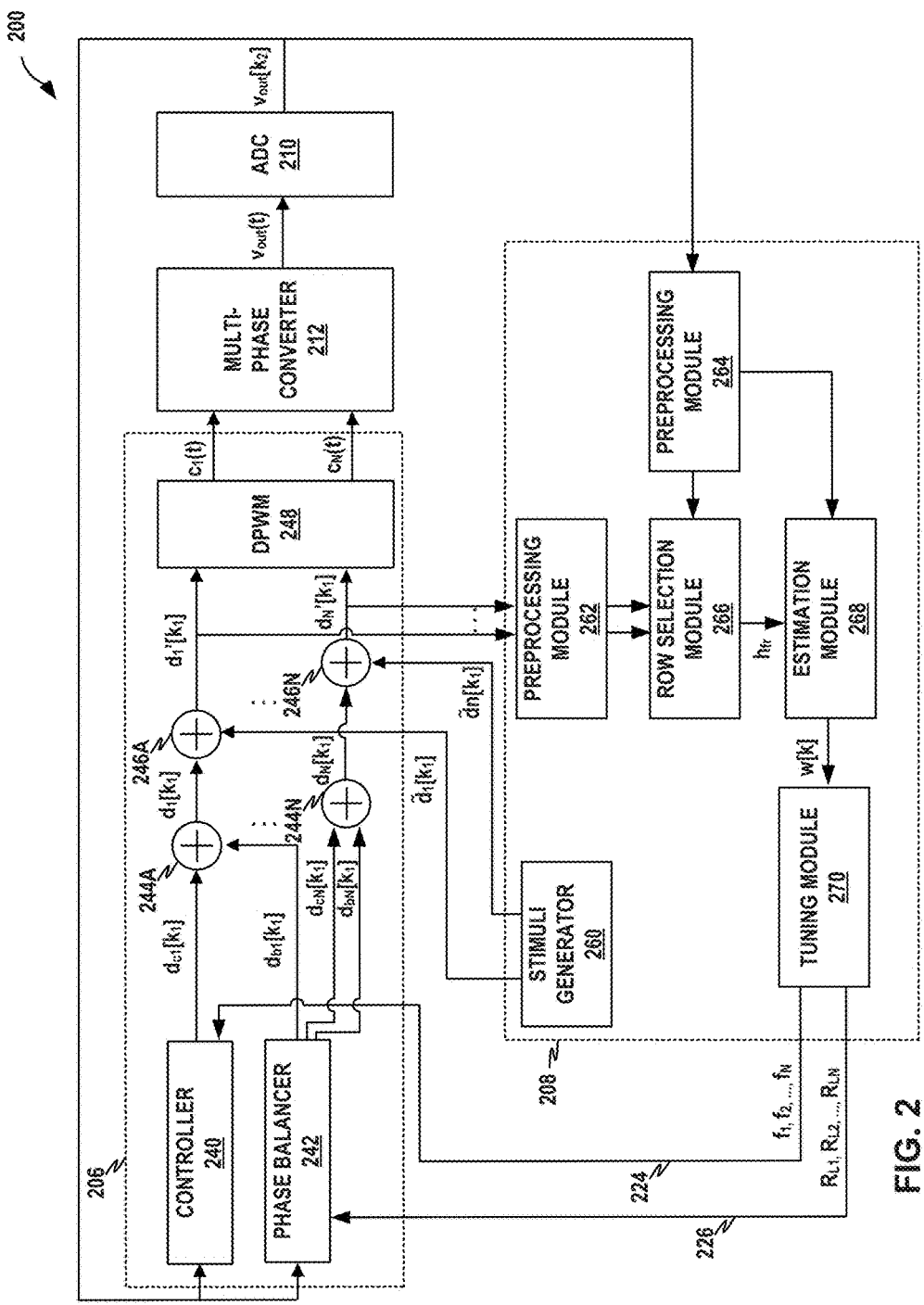
FIG. 2 is a block diagram illustrating an example system identification module configured for use with a control module, in accordance with one or more techniques of this disclosure.

FIG. 2 is a block diagram illustrating an example system identification module 208 configured for use with a control module 206, in accordance with one or more techniques of this disclosure. As shown, system 200 may include control module 206, multi-phase converter 212, ADC 210, and system identification module 208. Control module 206 may be an example of control module 106 of FIG. 1. Multi-phase converter 212 may be an example of converter 112 of FIG. 1. System identification module 208 may be an example of system identification module 108 of FIG. 1. ADC 210 may be an example of ADC 110 of FIG. 1.

Control module 206 may include controller 240, phase balancer 242, summers 244A-244N (collectively, summers 244), summers 246A-246N (collectively, summers 246), and digital pulse-width modulator ("DPWM") 248. Controller 240 may be tuned using the candidate natural frequency value or coefficient vector. For example, controller 240 may be a proportional-integral-derivative (PID) controller. In some examples, controller 240 may be a state-space controller. Controller 240 may receive, from tuning module 270, the candidate natural frequency value. In this example, controller 240 may calculate tuned coefficients to improve a dynamic performance of multi-phase converter 212.

System identification module 208 may include stimuli generator 260, preprocessing module 262, preprocessing module 264, row selection module 266, estimation module 268, and tuning module 270. As described further, system identification module 208 may include processing circuitry configured to generate a coefficient vector, estimate the plurality of natural frequency values and/or coefficients vector, and tune controller 240.

Stimuli generator 260 allows for the simultaneous perturbation of all phases in an N-phase converter. For example, stimuli generator 260 may be configured for simultaneous perturbation of all phases in an multi-phase converter 212. As such, the injection time is reduced by a factor of N, compared to systems that use time-multiplex stimuli. In some examples, stimuli generator 260 generates a perturbation sequence with an approximately Dirac shaped autocorrelation frequency and low cross correlation between duty cycle perturbations of different phases.

Preprocessing module 262 may preprocess the duty cycles $d_n'[k_1]$ before system identification. Preprocessing module 262 may be configured to perform one or more preprocessing steps, which may include, but are not limited to, noise filtering and mean removal, which improve the accuracy and convergence speed of system identification module 208.

Preprocessing module 264 may preprocess the output voltage $v_{out}[k_2]$ before system identification. Preprocessing module 262 may be configured to perform one or more preprocessing steps, which may include, but are not limited to, noise filtering and mean removal, which improve the accuracy and convergence speed of system identification module 208.

Row selection module 266 may generate an observation matrix based on the output voltage and the plurality of perturbed duty cycle values. For example, row selection module 266 may generate the observation matrix based on the output of preprocessing module 262 and preprocessing module 264. Row selection module 266 may select a row of the observation matrix to improve the accuracy and convergence speed of system identification module 208.

In some examples, row selection module 266 may randomly select a row of the observation matrix. For example, row selection module 266 may select a row (e.g., "$h_{fr}$") as follows. First, row selection module 266 calculates $\|h_{fi}^T\|_2^2$ and $$c_i = \sum_{j=1}^{i} \|h_{fj}^T\|_2^2$$

for each row i of the observation matrix. In this example, row selection module 266 calculates m random numbers $r_k$ drawn from a uniform distribution. In this example, row selection module 266 selects the row number r of the observation matrix $H_f$ that is chosen in the k-th iteration step such that $r_k c_m < c_{r+1}$ and $r_k c_m \geq c_r$ simultaneously hold.

Estimation module 268 may generate a coefficient vector of system parameters for multi-phase converter 212. It should be understood that estimation module 268 may use a batch least squares algorithm, an iterative least squares algorithm, a recursive least squares algorithm, a dichotomous coordinate descent algorithm, or another algorithm to generate the coefficient vector. Nevertheless, due to its low-complexity, the algorithm described in Gietler, C. Unterrieder, A. Berger, R. Priewasser, and M. Lunglmayr. Low-complexity, high frequency parametric system identification method for switched-mode power converters. In Proceedings of IEEE Applied Power Electronics Conference and Exposition (APEC'2017), March 2017, which is incorporated by reference in its entirety may be used. Moreover, the algorithm described in US Patent Application Publication 2014/0372056 A1, which is incorporated by reference in its entirety may be used.

More specifically, estimation module 268 may be configured to use an algorithm that represent a process to find an approximate solution of the least squares problem given in B. Miao, R. Zane, and D. Maksimovic, "System identification of power converters with digital control through cross-correlation methods," IEEE Transactions on Power Electronics, vol. 20, no. 5, pp. 1093-1099, September 2005. The algorithm may be an iterative technique for finding the coefficient vector w. The update equation for the estimated coefficients w in each iteration step is given as follows.

$$w[k] = w[k-1] - 2\mu h_{fr}^T(v_{fout}[k] - h_{fr} w[k-1]) \quad (1)$$

In equation (1), $h_{fr}$ is a row of the matrix $H_f$ and $\mu$ is the fixed or variable step size. In equation (1), $H_f$ is an observation matrix comprised of the preprocessed duty cycles $d_{fn}'[k]$ and preprocessed output voltage $v_{fout}[k]$.

For example, estimation module 268 may multiply the randomly selected row (e.g., "$h_{fr}$") of the observation matrix and a coefficient vector (e.g., "w[k -1]") for a previous switching period to generate an estimated voltage output (e.g., "$h_{fr}$ w[k-1]"). In this example, estimation module 268 may subtract the estimated output voltage (e.g., "$h_{fr}$ w[k-1]") from the output voltage (e.g., "$v_{fout}[k]$") to generate an error value. In this example, estimation module 268 may multiply the error value by a correction multiplier (e.g., "$2\mu$") and a transposition of the randomly selected row of the observation matrix (e.g., "$h_{fr}^T$") to generate a correction vector. In this example, estimation module 268 may subtract the correction vector (e.g., "$2\mu h_{fr}^T(v_{fout}[k] - h_{fr} w[k-1])$") from the coefficient vector for the previous switching period (e.g., "w[k-1]").

Advantages of one or more techniques described herein over other techniques may include a relatively low computational cost compared to other techniques as illustrated in table I below. For example, one or more techniques described herein have a complexity (multiplications) of p+2 (e.g. improvement of more than factor 3 for p=4 in comparison with DCD-RLS), while providing satisfying estimation accuracy.

TABLE I

Comparison of complexity of different system identification algorithms.

| Methodology | Complexity (multiplications per iteration) | Additional remarks |
|---|---|---|
| Batch Least Squares (BLS) | $\frac{p^3}{6} + mp^2 + pm$ | Assuming use of Cholesky decomposition method for calculating the pseudo-inverse |
| Iterative Least Squares (ILS) | $2pm + p$ | |
| Recursive Least Squares (RLS) | $\frac{p^3}{2} + 2p^2 + 4p$ | Needed divisions are counted as multiplications |
| Dichotomous coordinate descent (DCD) - RLS | $2p^2 + 3p$ | |
| One or more techniques described herein | $3p + 2$ | |

Advantages of one or more techniques described herein over other solutions may include a simple architecture for the implementation. For example, one or more techniques described herein may be implemented in hardware or software. As such, system identification module 208 may have a relatively low complexity, particularly for, a digital controller of a DC-DC converter, compared to other techniques. For example, estimation module 268, when using one or more techniques described herein, may reduce the number of multiplications compared to other techniques because only one row is used at each iteration step.

Tuning module 270 may estimate one or more natural frequency values for multi-phase converter 212. For example, tuning module 270 estimates one or more natural frequency values for multi-phase converter 212 based on a coefficient vector output by row selection module 266. In some examples, tuning module 270 estimates one or more phase resistance values or values proportional to the phase resistance values for multi-phase converter 212. For example, tuning module 270 estimates one or more phase resistance values or values proportional to the phase resistance values for multi-phase converter 212 based on a coefficient vector output by row selection module 266.

Tuning module 270 may perform phase balancing of multi-phase converter 212 based on the plurality of phase resistance values or values proportional to the phase resistance values. The small-signal duty cycle to output voltage transfer function for an N-phase converter is given by a MISO (multiple-input single-output) system of the form as follows.

$$\tilde{v}_{out} = G_{vd}(z)\tilde{d} = \frac{1}{z^N + \ldots + a_1}\begin{bmatrix} b_{N1}z^{N-1} + \ldots + b_{31}b_{11} \\ \vdots \\ b_{NN}z^{N-1} + \ldots + b_{31}b_{1N} \end{bmatrix}^T \begin{bmatrix} \tilde{d}_1 \\ \vdots \\ \tilde{d}_N \end{bmatrix} \quad (2)$$

In some examples, tuning module 270 may be configured for simultaneous system identification of all individual phases of multi-phase converter 212. Therefore, the result can be used for both controller tuning of each individual phase and current balancing. For current balancing, terms inversely proportional to the DC gain of each phase n are calculated as $$\hat{R}_{L_n} = \frac{1}{\sum_{i=1}^{N} \hat{b}_{in}}.$$

Consequently, phase balancer 242 may use these estimates to help to ensure equal current sharing between the phases of multi-phase converter 212.

More specifically, for example, phase balancer 242 may generate, for each phase of the multi-phase converter, a balancing value (e.g., "$d_{b1}[k_1], \ldots, d_{bN}[k_1]$") based on the plurality of phase resistance values. In this example, phase balancer 242 may inject, for each phase of the multi-phase converter, the current balancing value onto a respective command duty cycle value of the plurality of command duty cycle values. For example, as shown in FIG. 2, summers 244 inject the balancing value (e.g., "$d_{b1}[k_1], \ldots, d_{bN}[k_1]$") onto respective command duty cycle values (e.g., "$d_{c1}[k_1], \ldots, d_{cN}[k_1]$") to form a duty cycle value for each phase of the multi-phase converter (e.g., "$d_1[k_1], \ldots, d_N[k_1]$").

In the example of FIG. 2, stimuli generator 260 generates a perturbation sequence $\tilde{d}_n[k_1]$. Summers 246 superimpose perturbation sequence $\tilde{d}_n[k_1]$ onto the duty cycle $d_n[k_1]$ of every phase of multi-phase converter 212. The duty cycle $d_n[k_1]$ may be the output of controller 240 (with or without phase balancer 242) or a static duty cycle. Perturbation sequence $\tilde{d}_n[k_1]$ may include, but are not limited to, PRBS (pseudo random binary sequences) and sinusoidal chirp sequences. The actuating signals $c_n(t)$ for the switching elements of each phase of the multi-phase converter 212 may be generated by DPWM 248 which is fed by the perturbed duty cycles $d_n'[k_1]$. In case of an N-phase DC-DC converter, stimuli generator 260 produces n sequences for perturbation of each phase's duty cycle. During the injection of the perturbation sequence, ADC 210 senses the output voltage $v_{out}(t)$ and converts the output voltage to the digital representation $v_{out}[k_2]$.

The duty cycles $d_n'[k_1]$ and the digitized output voltage measurement $v_{out}[k_2]$ obtained during the system identification phase may be processed by system identification module 208. For example, preprocessing module 262 and 264 may filter the sequences $d_n'[k_1]$ and $v_{out}[k_2]$ and the actual system identification step resulting in estimates of the converter parameters such as coefficients of the duty cycle to output voltage transfer function, natural frequency and damping factor. Tuning module 270 may use the estimated system parameters. For example, tuning module 270 may use the estimated system parameters for automatic controller tuning and/or sensorless current balancing in case of a multi-phase converter.

One or more advantages may be achieved by system 200 compared to systems that do not use simultaneous perturbation of all phases. For example, system 200 may have a low computational cost compared to systems that do not use simultaneous perturbation of all phases, resulting in possibly less chip area and power consumption. In some examples, system 200 may have a simple architecture for the implementation, with high flexibility and reusability compared to systems that do not use simultaneous perturbation of all phases, which may be implemented in hardware or software. In some examples, system 200 may have a lower injection time in multi-phase converters due to parallel excitation of all phases compared to systems that do not use simultaneous perturbation of all phases. For example, the injection time of system 200 may be reduced by a factor of N compared to systems that do not use simultaneous perturbation of all phases. Therefore, the non-operational time/time with higher output voltage deviation is reduced compared to systems that do not use simultaneous perturbation of all phases. In some examples, system 200 may be configured for multiple objectives such as controller tuning, current balancing, and system monitoring. As such, system 200 may have an improved performance and robustness, be cheaper and/or have smaller external components, and have a significant cost advantage compared to systems that do not use simultaneous perturbation of all phases. In some examples, system 200 may be configured for monitoring of external component tolerances to improve an accuracy over a lifetime of system 200 and/or to use external component tolerances in safety-relevant applications. Moreover, system 200 may omit current sensing.

Figure 3:
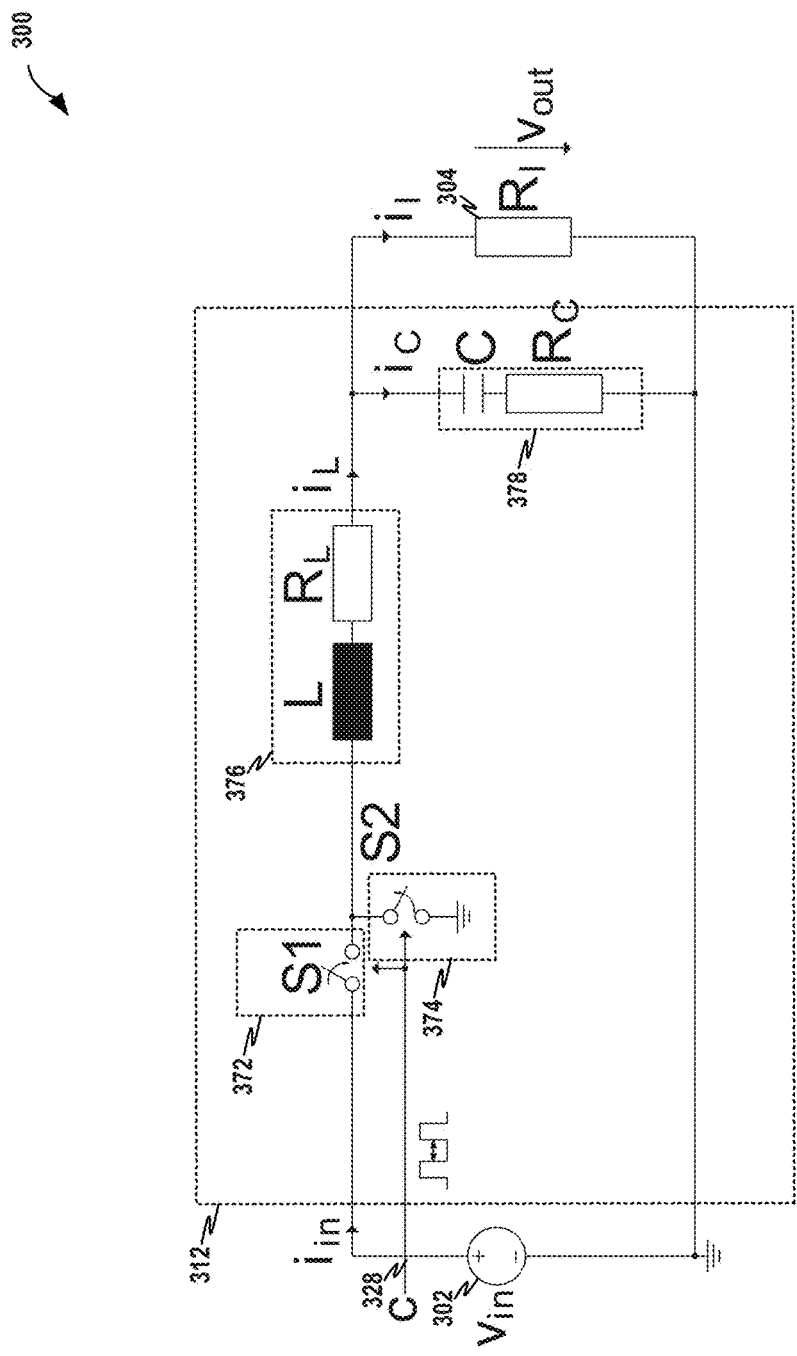
FIG. 3 is a circuit diagram illustrating an example single-phase converter configured for use with a system identification module, in accordance with one or more techniques of this disclosure.

FIG. 3 is a circuit diagram illustrating an example single-phase converter 312 configured for use with a system identification module, in accordance with one or more techniques of this disclosure. System 300 may include single-phase converter 312, voltage source 302, and load 304. Voltage source 302 may be an example of voltage source 102 of FIG. 1. Load 304 may be an example of load 104 of FIG. 1. Single-phase converter 312 may be an example of converter 112 of FIG. 1. As shown, single-phase converter 312 may include high side switching element 372, low side switching element 374, inductor 376, and capacitor 378.

In the example of FIG. 3, single-phase converter 312 is arranged as a synchronous buck converter. Note that one or more proposed techniques described herein are also applicable to other converter types. In order to achieve the desired output voltage, the power switches (e.g., high side switching element 372, low side switching element 374, etc.) are controlled by switching signal 328 ("c") with perturbed duty cycle value d'[k$_1$]. Although not shown, to prevent shoot-through, that is simultaneous conduction of high side switching element 372 and low side switching element 374, appropriate dead times may be generated.

As shown in FIG. 3, low side switching element 374 has a first node coupled to high side switching element 372, a second node coupled to a reference node, and a gate node. Examples of a reference node may include, but are not limited to, an earth ground, ground plane, chassis ground, signal ground, a reference node not associated with a ground, or another reference node. Low side switching element 374 ("S$_2$") may be optionally replaced by a diode. Similarly, high side switching element 372 has a first node coupled to low side switching element 374, a second node coupled to voltage source 302, and a gate node.

As shown in FIG. 3, single-phase converter 312 may include inductor 376 having a first node coupled to high side switching element 372 and low side switching element 374 and second node. In this example, single-phase converter 312 may include capacitor 378 having a first node coupled to the second node of inductor 376 and a second node coupled to the reference node.

Figure 4:
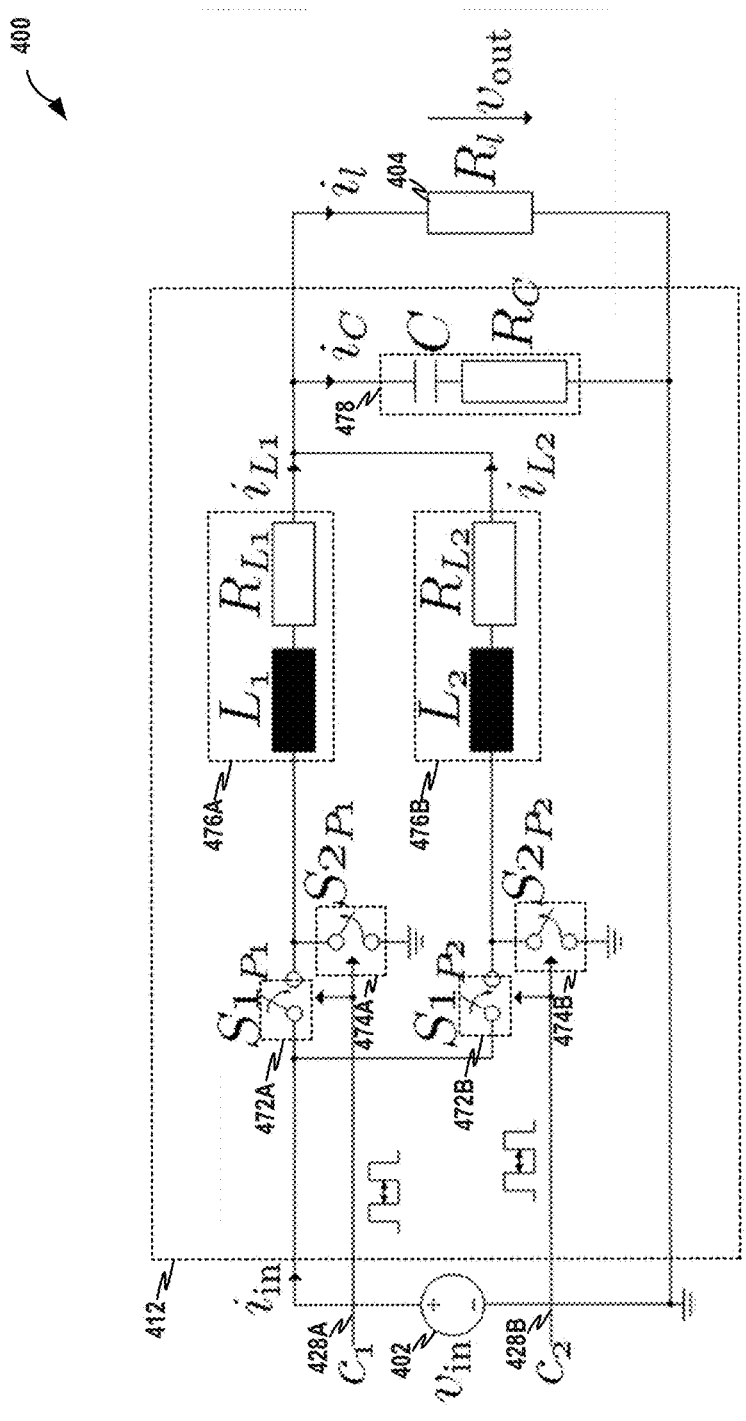
FIG. 4 is a circuit diagram illustrating an example multi-phase converter configured for use with a system identification module, in accordance with one or more techniques of this disclosure.

Automatic controller tuning for a single-phase buck converter is presented in FIG. 3 and a sensorless current sharing for a two-phase buck converter is presented in FIG. 4. It should be understood that, both the automatic controller tuning and the sensorless current sharing are applicable to N-phase converters.

In the example circuit of a single-phase buck converter illustrated in FIG. 3, a second order system may be used with the parasitic elements as shown in Table II.

TABLE II

| | parasitic elements. |
|---|---|
| $R_L$ | ESR (equivalent series resistance) of the inductor + on-resistance of the switches $S_1$, $S_2$ |
| $R_C$ | ESR of the capacitor output capacitor |

An exemplary system model for single-phase converter 312 is discussed in the following. The small-signal discrete-time duty cycle to output voltage transfer function is given as follows.

$$\frac{\tilde{v}_{out}}{\tilde{d}} = G_{vd}(z) = \frac{b_1 z + b_2}{z^2 + a_1 z + a_2}, \quad (3)$$

Equation (3) yields the following difference equation in time domain, with the output voltage perturbation $\tilde{v}_{out}$ and the duty cycle perturbation $\tilde{d}$.

$$\tilde{v}_{out}[k] = b_1 \tilde{d}[k-1] + b_2 \tilde{d}[k-2] - a_1 \tilde{v}_{out}[k-1] - a_2 \tilde{v}_{out}[k] \quad (4)$$

In this example, p=4, as 4 parameters have to be estimated (b$_1$, b$_2$, a$_1$, a$_2$). This results in a computational complexity of 3·4+2=14 multiplications per iteration for the proposed estimation algorithm compared to 44 multiplications for the DCD algorithm.

System identification is discussed in the following. During the system identification phase, the duty cycle of single-phase converter 312 is perturbed with a stimulus such as a PRBS sequence or a sinusoidal chirp. Based on the measured output voltage and known input stimulus, an observation matrix $H_f$ is built and the proposed system identification algorithm is used to calculate estimates for the coefficients of equation (4).

An estimate of the converter's natural frequency may be obtained based on the identified coefficients $\hat{a}_1$ and $\hat{a}_2$ as follows.

$$\hat{f}_n = \frac{\sqrt{(\ln \hat{a}_2)^2 + 4 a \cos \frac{-\hat{a}_1}{\sqrt[2]{\hat{a}_2}}}}{4 \pi T_s}. \quad (5)$$

A digital PID controller in parallel form is chosen with the discrete-time transfer function given as follows.

$$C_{vd}(z) = K_p + \frac{K_i}{1-z^{-1}} + K_d(1-z^{-1}), \quad (6)$$

In equation (6), the proportional, integral and derivative gains are $K_p$, $K_i$ and $K_d$. Initially, the controller may be designed based on the nominal converter parameters and thus the nominal natural frequency $f_{n,nom}$ resulting in the gains $K_{p,nom}$, $K_{i,nom}$, $K_{i,nom}$. After system identification, an estimate of the natural frequency is obtained with equation (5). Subsequently, the controller gains may be tuned according to the following.

$$K_p = K_{p,nom} \frac{\hat{f}_n}{f_{n,nom}} \qquad (7)$$

$$K_i = K_{i,nom} \frac{\hat{f}_n}{f_{n,nom}}$$

$$K_d = K_{d,nom} \frac{\hat{f}_n}{f_{n,nom}}$$

Figure 13:
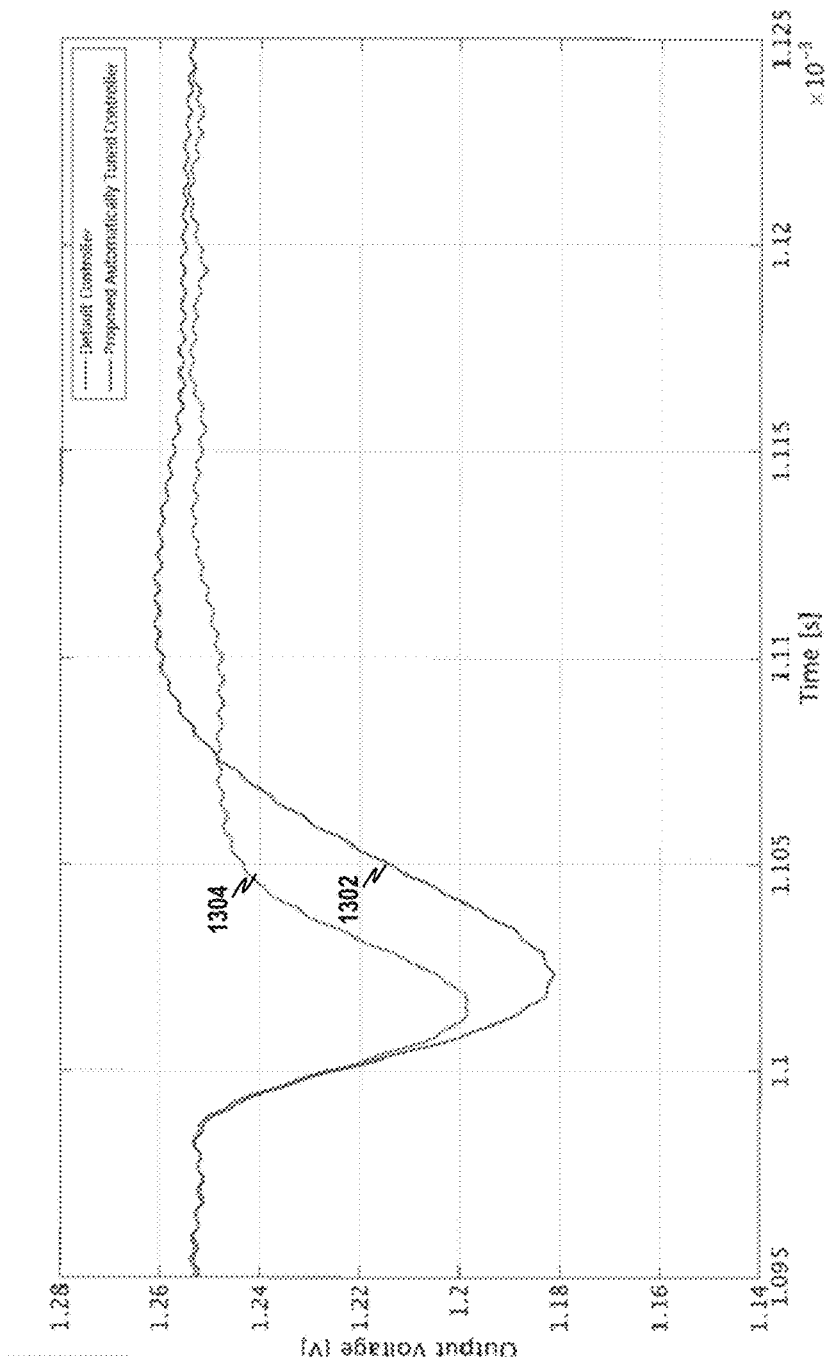
FIG. 13 is a graphical illustration of exemplary output voltage transient responses to a load jump, in accordance with one or more techniques of this disclosure.

Tuning a controller using equations (7) may result in an improved performance in terms of transient response and stability of the controller, as shown in FIG. 13.

FIG. 4 is a circuit diagram illustrating an example multi-phase converter configured for use with a system identification module, in accordance with one or more techniques of this disclosure. System 400 may include multi-phase converter 412, voltage source 402, and load 404. Voltage source 402 may be an example of voltage source 102 of FIG. 1. Load 404 may be an example of load 104 of FIG. 1. Multi-phase converter 412 may be an example of converter 112 of FIG. 1. As shown, multi-phase converter 412 may include high side switching elements 472A and 472B (collectively, high side switching elements 472), low side switching elements 474A and 474B (collectively, low side switching elements 474), inductors 476A and 476B (collectively, inductors 476), and capacitor 478. Although multi-phase converter 412 is illustrated as having two phases, other examples may include a multi-phase converter having n-number of phases, where n is greater than 2.

In the example of FIG. 4, multi-phase converter 412 is arranged as a synchronous buck converter. Note that the proposed concept is also applicable to other converter types. In order to achieve the desired output voltage, high side switching element 472A and low side switching element 474A are controlled by switching signal 428A ("$c_1$") perturbed duty cycle value $d_1'[k_1]$. Similarly, high side switching element 472B and low side switching element 474B are controlled by switching signal 428B ("$c_2$") with perturbed duty cycle value $d_2'[k_1]$. Although not shown, to prevent shoot-through, that is simultaneous conduction of high side switching element 472A and low side switching element 474A and/or simultaneous conduction of high side switching element 472B and low side switching element 474B, appropriate dead times may be generated.

As shown in FIG. 4, low side switching element 474A has a first node coupled to high side switching element 472A, a second node coupled to a reference node, and a gate node. Similarly, high side switching element 472A has a first node coupled to low side switching element 474A, a second node coupled to voltage source 402, and a gate node. Additionally, low side switching element 474B has a first node coupled to high side switching element 472B, a second node coupled to a reference node, and a gate node. Similarly, high side switching element 472B has a first node coupled to low side switching element 474B, a second node coupled to voltage source 402, and a gate node.

As shown in FIG. 4, multi-phase converter 412 may include inductor 476A having a first node coupled to high side switching element 472A and low side switching element 474A and second node. Similarly, multi-phase converter 412 may include inductor 476B having a first node coupled to high side switching element 472B and low side switching element 474B and second node. In this example, multi-phase converter 412 may include capacitor 478 having a first node coupled to the second node of the inductor 476A and the second node of the inductor 476B and having a second node coupled to the reference node.

Two-phase buck converter sensorless current balancing is discussed in the following. An exemplary circuit of a two-phase buck converter is illustrated in FIG. 4. Low side switching elements 474 ("$S_{2P_1}$" and "$S_{2P_2}$") may be optionally replaced by diodes. The phases (e.g., phase A and phase B) are designed to be identical. For example, an inductance of inductors 476 may be equal (e.g., $L_1=L_2$) and a resistance of inductors 476 may be equal (e.g., $R_{L_1}=R_{L_2}$), which results in equal phase currents during steady state and thus equal current sharing. Due to mismatches caused by effects such as, for example, component tolerances (e.g. $R_{L_1} \neq R_{L_2}$) and different trace resistances, the current is unequally shared between the phases in practical applications. Therefore, in order to achieve the desired current sharing, a current balancing loop may be used. With the systems illustrated in FIGS. 1-2, it is possible to achieve current sharing without the need of a physical current measurement, solely by estimation.

A system model for system 200 is discussed in the following. The small-signal discrete-time duty cycle to output voltage behavior of the converter depicted in FIG. 4 can be modeled as a third order MISO (multiple-input single-output) system of the form as follows.

$$\tilde{v}_{out} = G_{vd}(z)\tilde{d} = \frac{1}{z^3 + a_1 z^2 + a_2 z + a_3} \begin{bmatrix} b_{11}z^2 + b_{21}z + b_{31} \\ b_{12}z^2 + b_{22}z + b_{32} \end{bmatrix}^T \begin{bmatrix} \tilde{d}_1 \\ \tilde{d}_2 \end{bmatrix}, \qquad (8)$$

Equation (8) may be written as a difference equation as follows.

$$\tilde{v}_{out}[k] = -a_1\tilde{v}_{out}[k-1] - a_2\tilde{v}_{out}[k-2] - a_3\tilde{v}_{out}[k-3] + b_{11}\tilde{d}_1[k-1] + b_{21}\tilde{d}_1[k-2] + b_{31}\tilde{d}_1[k-3] + b_{12}\tilde{d}_2[k-1] + b_{22}\tilde{d}_2[k-2] + b_{32}\tilde{d}_2[k-3] \qquad (9)$$

In equation (9) the output voltage perturbation is $\tilde{v}_{out}$ and the duty cycle perturbations are $\tilde{d}_1$ and $\tilde{d}_2$. Therefore, p=9, as 9 parameters have to be estimated ($b_{11}$, $b_{21}$, $b_{31}$, $b_{12}$, $b_{22}$, $b_{32}$, $a_1$ $a_2$, $a_3$). This results in 29 multiplications per iteration compared to 189 multiplications per iteration for systems that use the DCD algorithm. A significant saving in computations and consequently computational power consumption can thus be achieved. In industrial applications, systems with 6 phases and more are applicable. In such configurations, the computational advantage is even greater.

Figure 5:
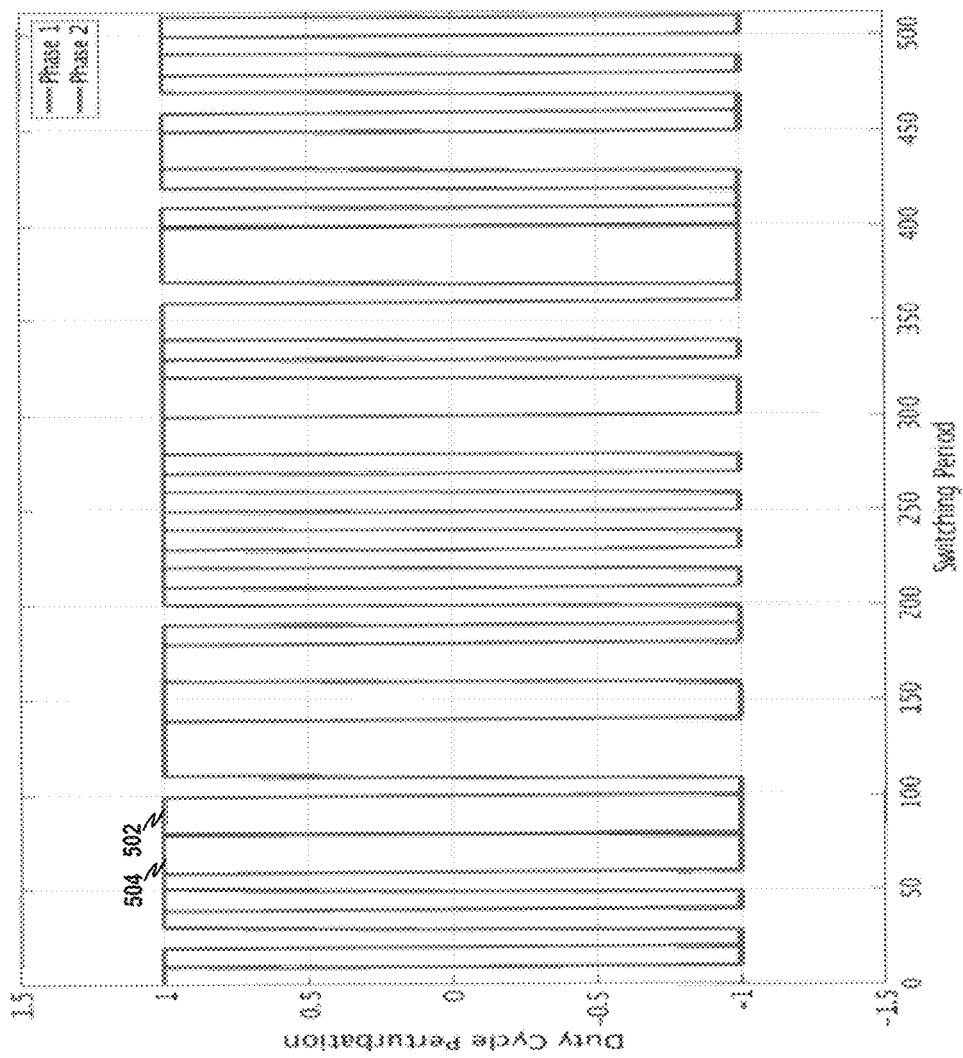
FIG. 5 is a graphical illustration of an exemplary perturbation sequence, in accordance with one or more techniques of this disclosure.

FIG. 5 is a graphical illustration of exemplary perturbation sequence, in accordance with one or more techniques of this disclosure. The abscissa axis (e.g., horizontal) of FIG. 5 represents a switching period and the ordinate axis (e.g., vertical) of FIG. 5 represents a perturbation sequence for a first phase 502 and a perturbation sequence for a second phase 504. By perturbing the duty cycles of both phases simultaneously in a two-phase converter, the injection time is halved compared to systems that use a time-multiplexed stimulation of the phases. Furthermore, a time-multiplexed stimulation is not practical in systems with a higher number of phases.

Figure 6:
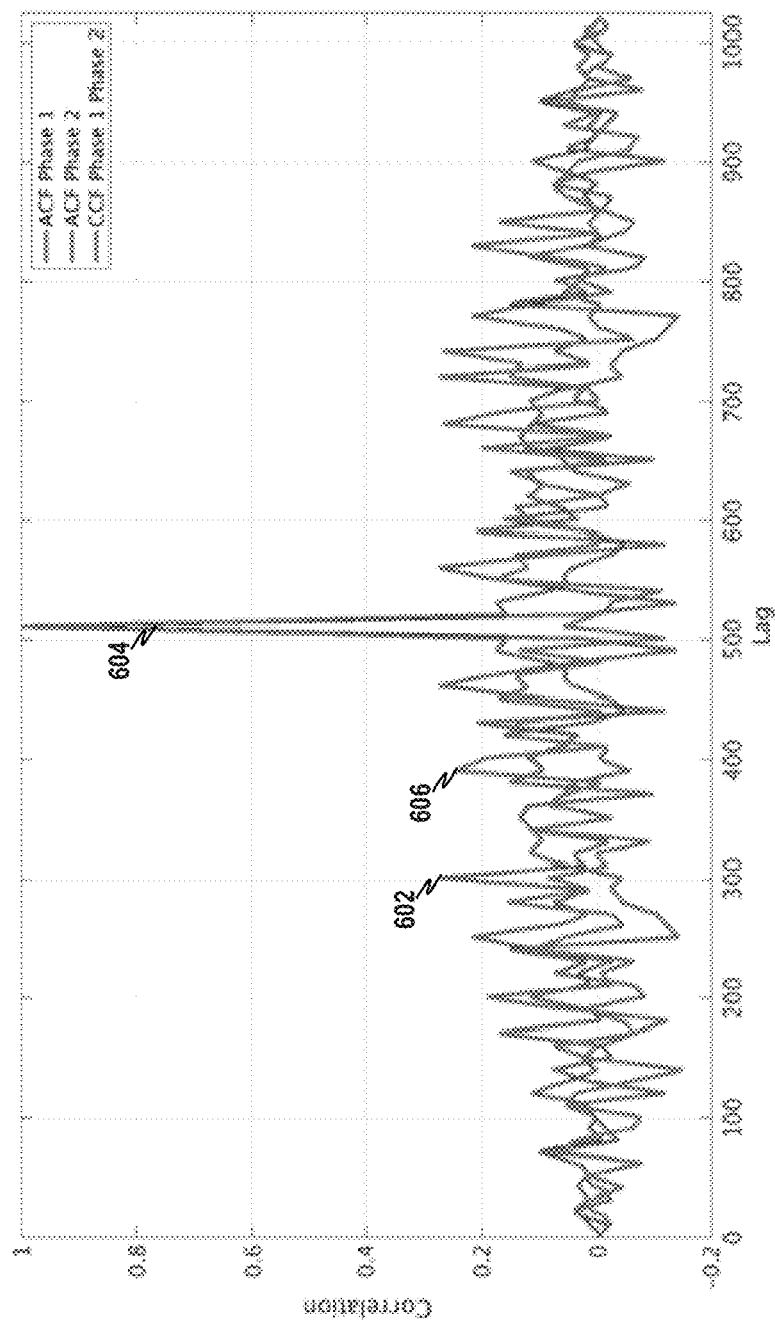
FIG. 6 is a graphical illustration of autocorrelation and crosscorrelation functions of the perturbation sequence of FIG. 5, in accordance with one or more techniques of this disclosure.

FIG. 6 is a graphical illustration of autocorrelation and crosscorrelation functions of the perturbation sequence of FIG. 5, in accordance with one or more techniques of this disclosure. The abscissa axis (e.g., horizontal) of FIG. 6 represents a lag and the ordinate axis (e.g., vertical) of FIG.

6 represents a correlation for a first phase 602, and correlation for a second phase 604, and a cross correlation for the first and second phases 606. FIG. 6 illustrates stimuli sequences that exhibit a low crosscorrelation and an approximately Dirac distribution shaped autocorrelation. As used herein, a pretribulation sequence with an approximately Dirac distribution shaped autocorrelation includes instances where the pretribulation sequence has values that are within 25% of a Dirac distribution shaped autocorrelation.

Figure 7:
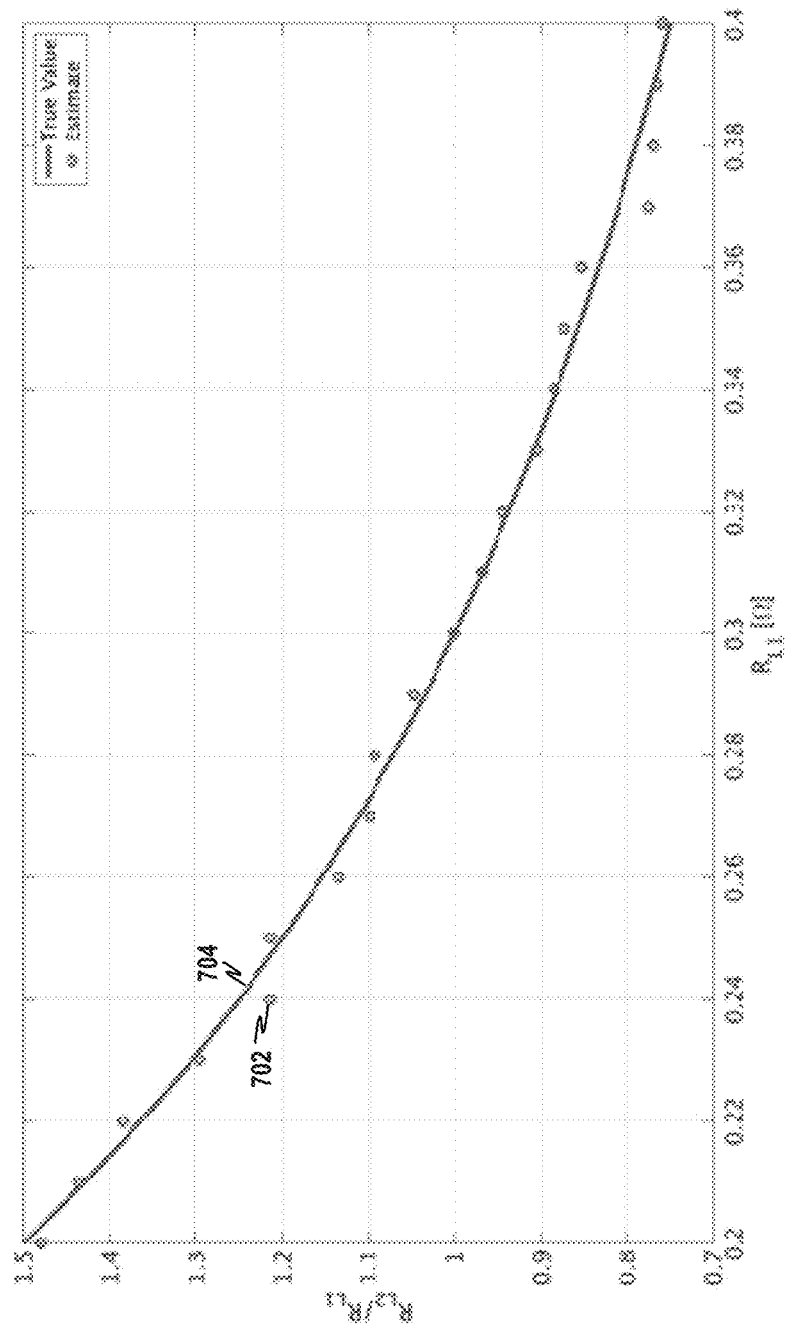
FIG. 7 is a graphical illustration of an estimated resistance mismatch ratio for a first phase, in accordance with one or more techniques of this disclosure.

FIG. 7 is a graphical illustration of an estimated resistance mismatch ratio for a first phase, in accordance with one or more techniques of this disclosure. The abscissa axis (e.g., horizontal) of FIG. 7 represents a phase resistance for a first phase and the ordinate axis (e.g., vertical) of FIG. 7 represents an estimated resistance mismatch ratio 702 and a measured resistance mismatch ratio 704.

Figure 8:
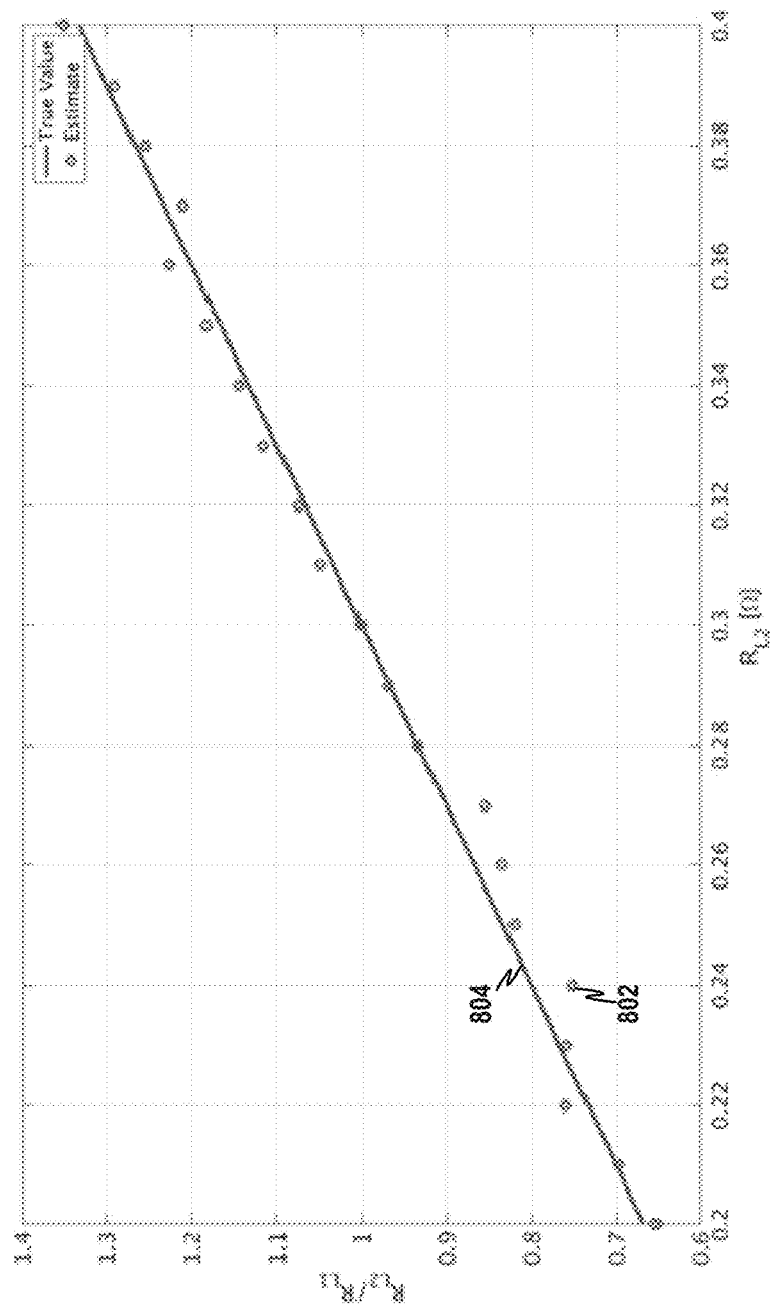
FIG. 8 is a graphical illustration of an estimated resistance mismatch ratio for a second phase, in accordance with one or more techniques of this disclosure.

FIG. 8 is a graphical illustration of an estimated resistance mismatch ratio for a second phase, in accordance with one or more techniques of this disclosure. The abscissa axis (e.g., horizontal) of FIG. 8 represents a phase resistance for a second phase and the ordinate axis (e.g., vertical) of FIG. 8 represents an estimated resistance mismatch ratio 802 and a measured resistance mismatch ratio 804.

Because the DC gains of equation (9) are indirectly proportional to the phase resistances, the estimated coefficients may be used to enable current balancing. Exemplary estimates are given as follows for the example of a two-phase converter.

$$\hat{R}_{L_1} = \hat{b}_{32} + \hat{b}_{22} + \hat{b}_{12}$$

$$\hat{R}_{L_2} = \hat{b}_{31} + \hat{b}_{21} + \hat{b}_{11} \quad (10)$$

In FIG. 7, the ratio $$\frac{R_{L_2}}{R_{L_1}}$$

for different values of $R_{L_1}$ with constant $R_{L_2} = 0.3\Omega$ is shown. The curve corresponds to the true value of $$\frac{R_{L_2}}{R_{L_1}}$$

while the dots mark the estimates $$\frac{\hat{R}_{L_2}}{\hat{R}_{L_1}}$$

obtained with the proposed techniques. In FIG. 8, the ratio $$\frac{R_{L_2}}{R_{L_1}}$$

for different values $R_{L_2}$ with constant $R_{L_1} = 0.3\Omega$ is shown. As can be seen, the estimates match the true values with very good accuracy.

The digital controller may use these estimates to calculate values proportional to the average phase currents at each switching cycle as follows.

$$\hat{i}_{L1}[k_1] = \frac{d_1[k_1]v_{in} - v_{out}[k_1]}{\hat{R}_{L_1}} \quad (11)$$

$$\hat{i}_{L2}[k_1] = \frac{d_2[k_1]v_{in} - v_{out}[k_1]}{\hat{R}_{L_2}}$$

A controller may force the error $e_{i_L}[k_1] = \hat{i}_{L1}[k_1] - \hat{i}_{L2}[k_1]$ towards 0 by modifying the duty cycles $d_1$ and $d_2$. This controller can be, but is not limited to, PI-type.

A laboratory setup has been built to demonstrate the performance of the proposed system identification algorithm. The coefficients and natural frequency of a single phase buck converter are estimated. The following system identification schemes have been compared: batch Least Squares (BLS), dichotomous coordinate descent (DCD-RLS), proposed algorithm with sequential traversal of observation matrix $H_f$ (SALS), and proposed algorithm with additional proposed randomized row selection of $H_f$ (R-ALS).

The algorithms have been tested with PRBS and sinusoidal chirp stimuli. The output voltage perturbation in response to the duty cycle perturbation is reported in FIGS. 9 and 11.

Figure 9:
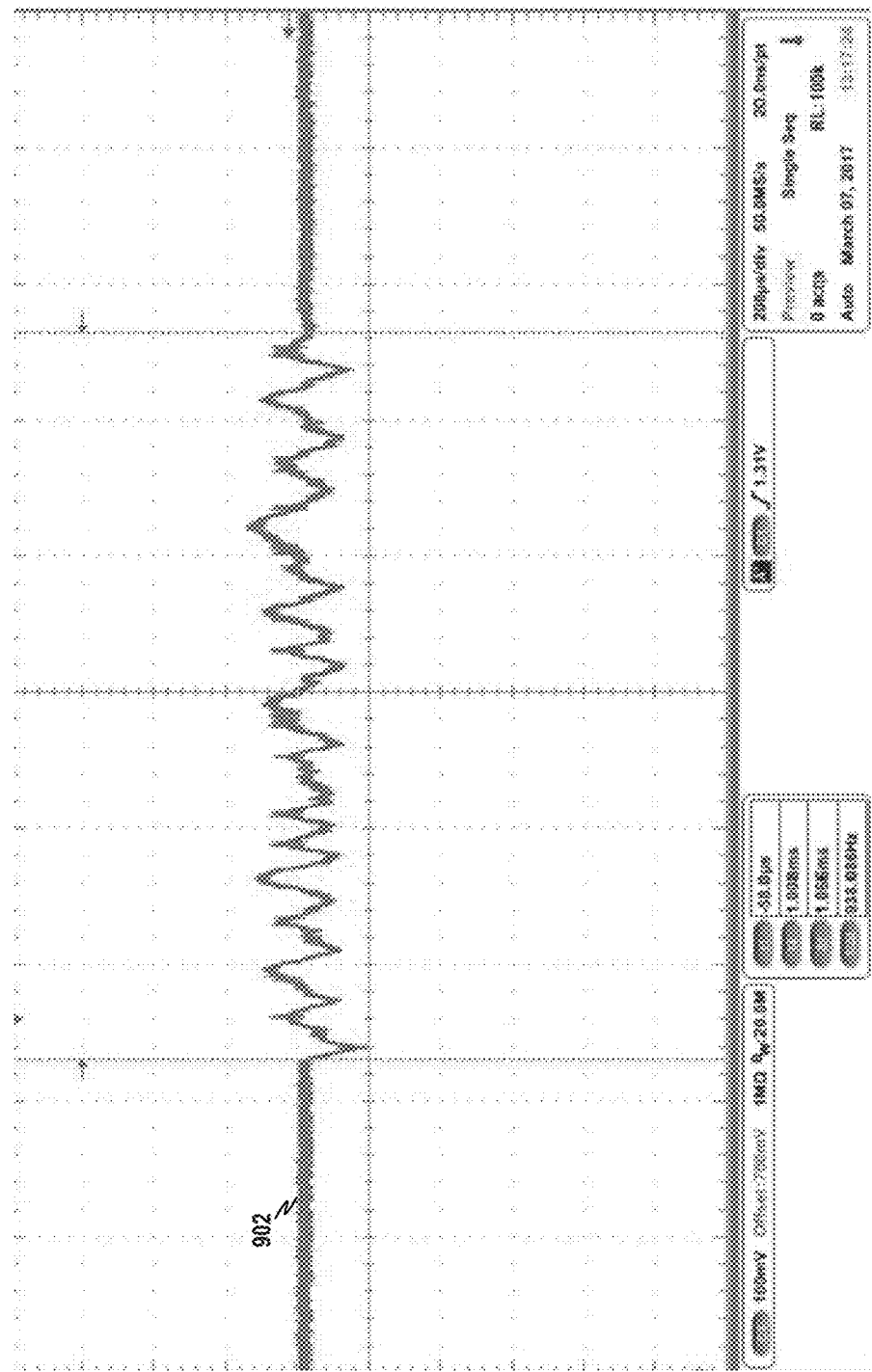
FIG. 9 is a graphical illustration of an output voltage perturbation in response to a pseudo random binary sequences stimulus, in accordance with one or more techniques of this disclosure.

FIG. 9 is a graphical illustration of an output voltage perturbation in response to a pseudo random binary sequences stimulus, in accordance with one or more techniques of this disclosure. The abscissa axis (e.g., horizontal) of FIG. 9 represents time and the ordinate axis (e.g., vertical) of FIG. 9 represents an output voltage 902.

Figure 10:
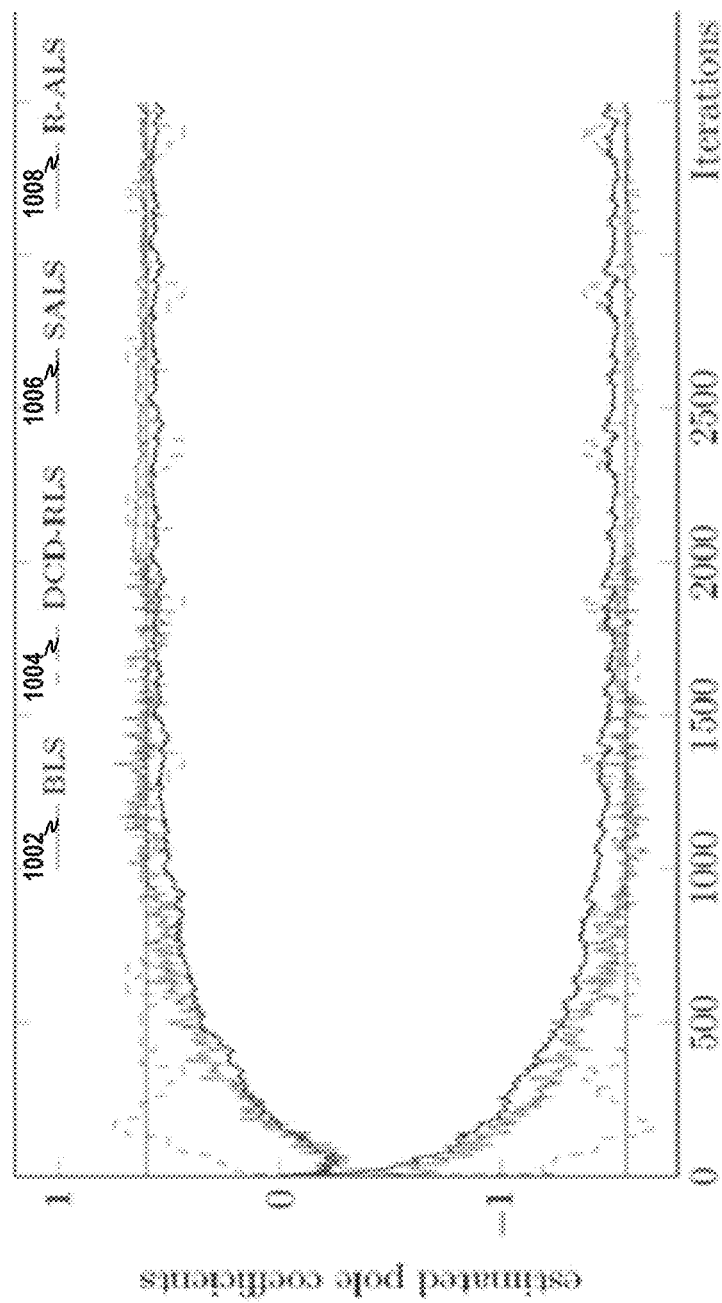
FIG. 10 is a graphical illustration of a convergence of estimated coefficients $â_1$, $â_1$ for a pseudo random binary sequences stimulus, in accordance with one or more techniques of this disclosure.

FIG. 10 is a graphical illustration of a convergence of estimated coefficients $\hat{a}_1$, $\hat{a}_1$ for a pseudo random binary sequences stimulus, in accordance with one or more techniques of this disclosure. The abscissa axis (e.g., horizontal) of FIG. 10 represents a number of iterations and the ordinate axis (e.g., vertical) of FIG. 10 represents an estimated pole coefficients for a BLS 1002, for a DCD-RLS 1004, a SALS 1006, and a R-ALS 1008.

Figure 11:
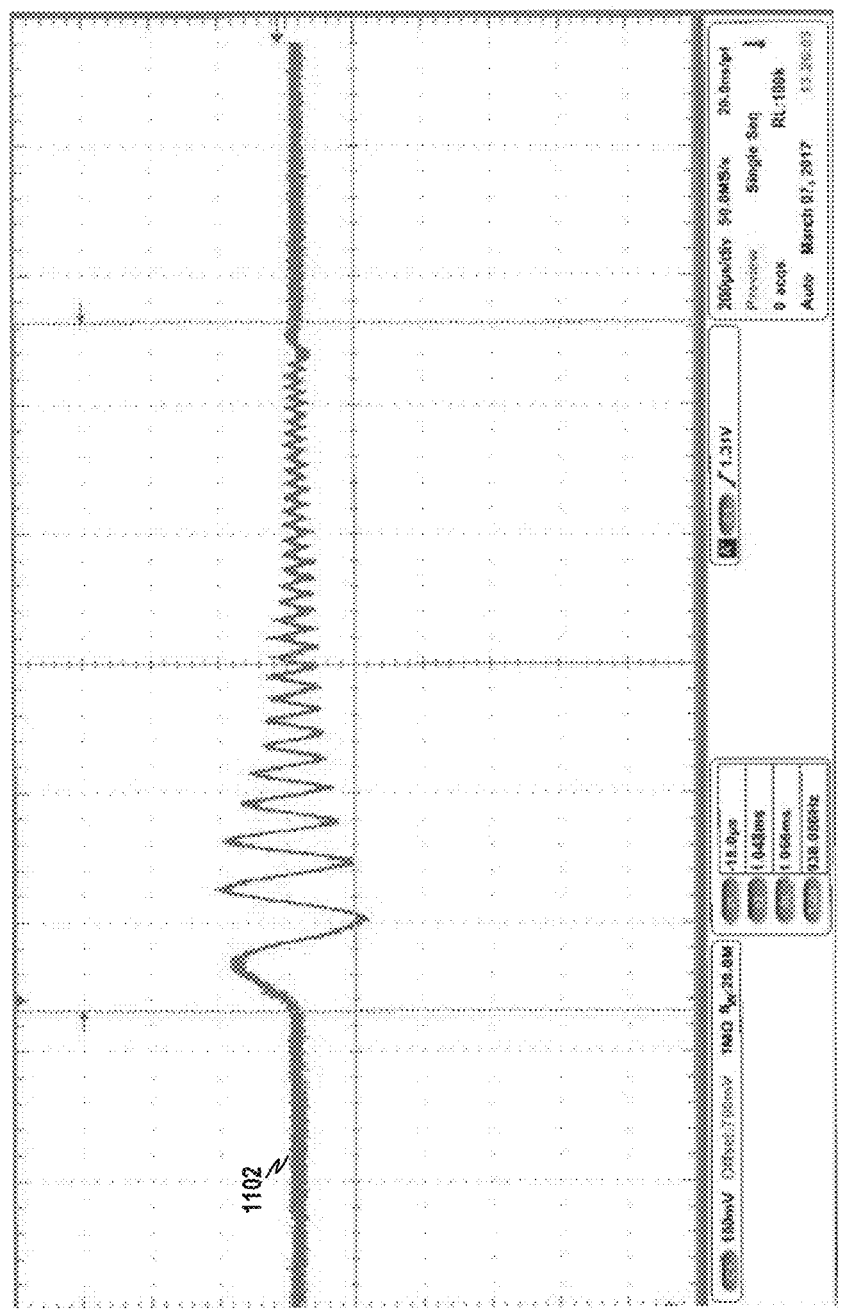
FIG. 11 is a graphical illustration of an output voltage perturbation in response to a sinusoidal chirp stimulus, in accordance with one or more techniques of this disclosure.

FIG. 11 is a graphical illustration of an output voltage perturbation in response to a sinusoidal chirp stimulus, in accordance with one or more techniques of this disclosure. The abscissa axis (e.g., horizontal) of FIG. 11 represents time and the ordinate axis (e.g., vertical) of FIG. 11 represents an output voltage 1102.

Figure 12:
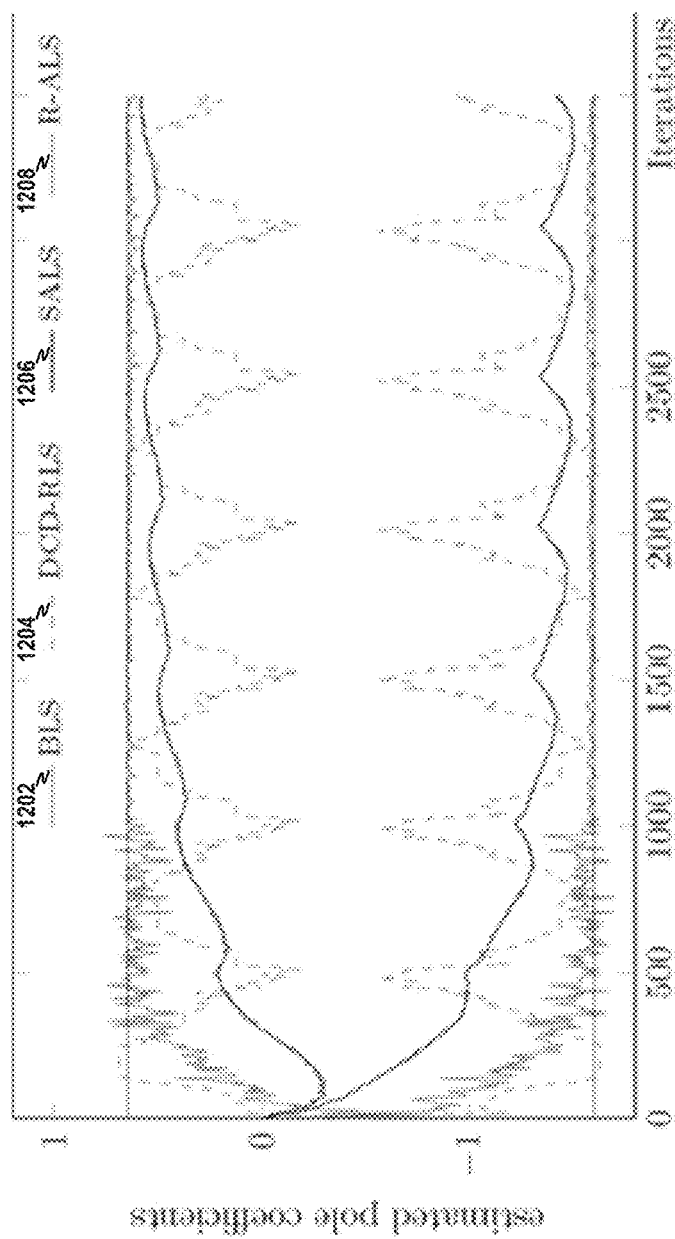
FIG. 12 is a graphical illustration of a convergence of estimated coefficients $â_1$, $â_1$ for a sinusoidal chirp stimulus, in accordance with one or more techniques of this disclosure.

FIG. 12 is a graphical illustration of a convergence of estimated coefficients $\hat{a}_1$, $\hat{a}_1$ for a sinusoidal chirp stimulus, in accordance with one or more techniques of this disclosure. The abscissa axis (e.g., horizontal) of FIG. 12 represents a number of iterations and the ordinate axis (e.g., vertical) of FIG. 12 represents an estimated pole coefficients for a BLS 1202, for a DCD-RLS 1204, a SALS 1206, and a R-ALS 1208.

For exemplary purposes, the convergence behavior of the coefficients $\hat{a}_1$, $\hat{a}_1$ is shown in FIGS. 10 and 12 for the two stimuli and different algorithms. As can be seen, the DCD-RLS algorithm converges very fast but exhibits oscillatory behavior. In contrast, the proposed algorithms (SALS and R-ALS) may use slightly more iterations but the number of multiplications per iteration is reduced by a factor of more than 3 in comparison with DCD-RLS and no oscillatory behavior is observed.

In Table III, the estimated natural frequencies $\hat{f}_n$ for the two stimuli and different algorithms are listed. Note that the measured true natural frequency $f_n$ is close to the estimate obtained by BLS, thus this algorithm is used as a benchmark. The proposed algorithm, especially with the proposed additional randomized row selection scheme, achieves a higher accuracy than the DCD-RLS algorithm, while simultaneously using fewer multiplications.

TABLE III

Estimated natural frequency $\hat{f}_n$ for different stimuli and algorithms.

|  | PRBS | Chirp |
|---|---|---|
| BLS (Reference) | 18.3 kHz | 18.2 kHz |
| DCD-RLS | 21.2 kHz | 33.6 kHz |
| SALS | 23.3 kHz | 29.1 kHz |
| R-ALS | 17.4 kHz | 19.0 kHz |

FIG. 13 is a graphical illustration of exemplary output voltage transient responses to a load jump, in accordance with one or more techniques of this disclosure. The abscissa axis (e.g., horizontal) of FIG. 13 represents time and the ordinate axis (e.g., vertical) of FIG. 13 represents an output voltage 1302 for a representative untuned controller and an output voltage 1304 for a controller that is tuned using one or more techniques described herein.

Simulations for a single-phase buck converter have been carried out. In order to demonstrate the capability of the proposed auto-tuning techniques, a converter with a 50% lower C value than the nominal value is used. In FIG. 13, the output voltage response to a load jump is shown. The output voltage 1302 corresponds to the digital controller designed for the nominal values of the converter. Due to the mismatch between the actual and assumed component values, a large undershoot and a long settling time can be observed. The output voltage 1304 corresponds to a digital controller that has been tuned based on the proposed techniques and the estimated natural frequency of the converter. Clearly, the dynamic performance is improved, while maintain robustness.

Figure 14:
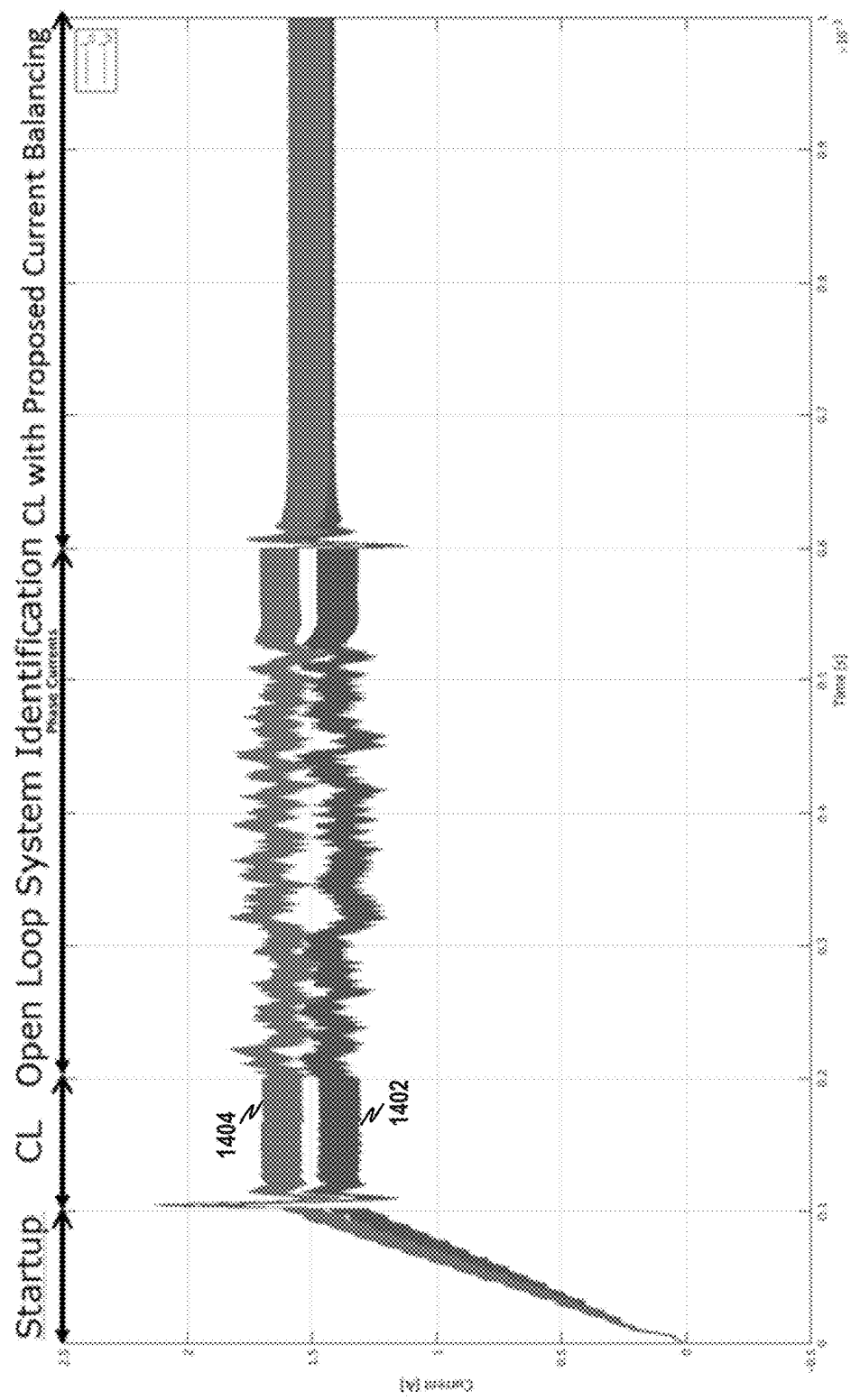
FIG. 14 is a graphical illustration of exemplary current balancing, in accordance with one or more techniques of this disclosure.

FIG. 14 is a graphical illustration of exemplary current balancing, in accordance with one or more techniques of this disclosure. The abscissa axis (e.g., horizontal) of FIG. 14 represents time and the ordinate axis (e.g., vertical) of FIG. 14 represents a phase current 1402 for a first phase and a phase current 1404 for a second phase. Simulations for a two-phase buck converter have been carried out.

In FIG. 14, the phase currents for a converter with $R_{L_1}=0.35\Omega$ and $R_{L_1}=0.3\Omega$ are reported. Due to different parasitic phase resistances, the current imbalance is clearly visible in the initial startup and closed loop phase. Rather than sensing the inductor currents, the proposed techniques is used to achieve current balancing. After a system identification phase, which is used to obtain the estimates $\hat{b}_{11}, \hat{b}_{21}, \hat{b}_{31}, \hat{b}_{12}, \hat{b}_{22}, \hat{b}_{32}, \hat{a}_1, \hat{a}_2, \hat{a}_3$ and subsequently $\hat{R}_{L_1}$ and $\hat{R}_{L_2}$, the digital controller utilizes equation (11) for current balancing.

Figure 15:
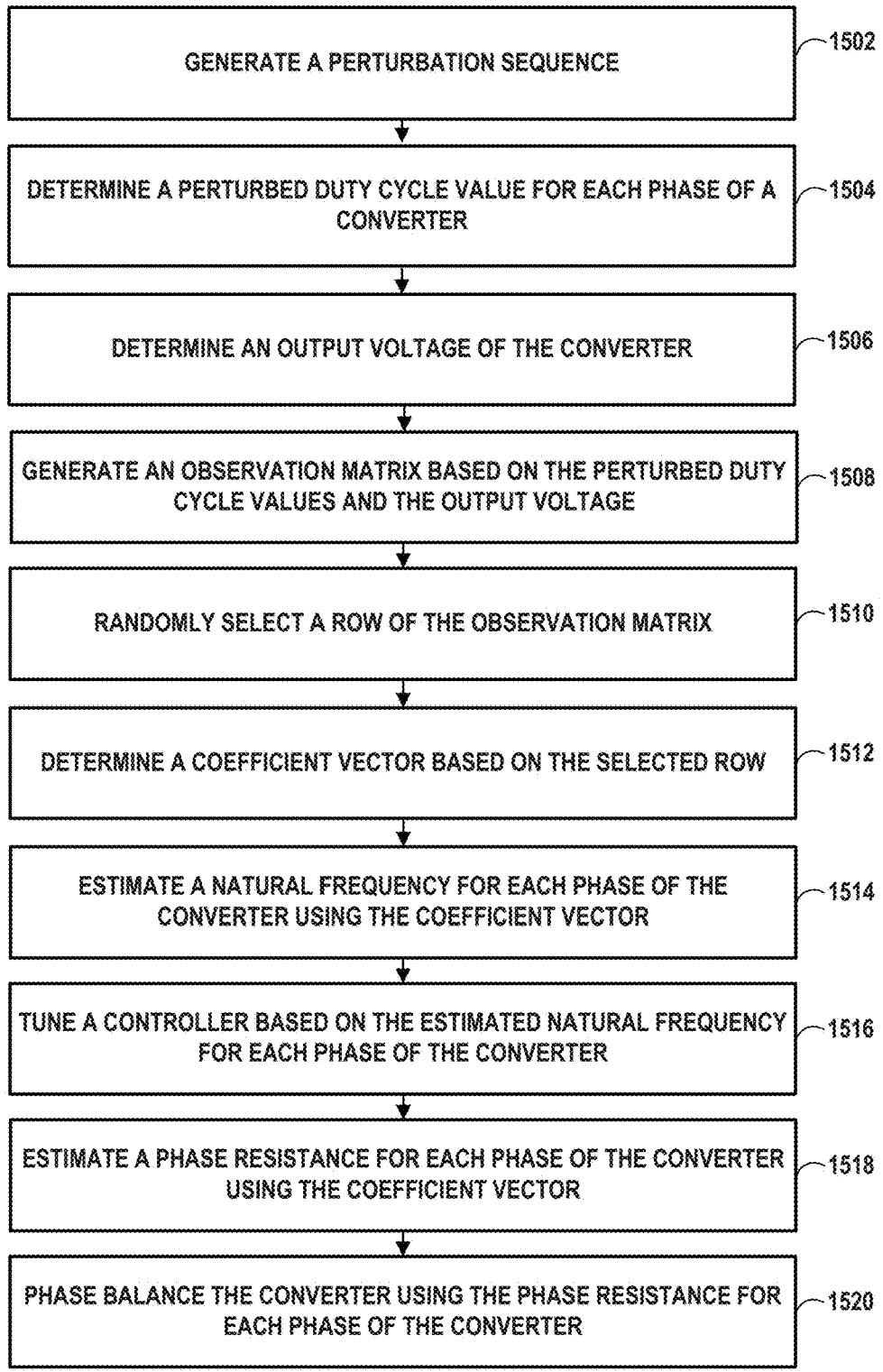
FIG. 15 is a flow diagram for controller tuning using a perturbation sequence, in accordance with one or more techniques of this disclosure.

FIG. 15 is a flow diagram for controller tuning using a perturbation sequence, in accordance with one or more techniques of this disclosure. FIG. 15 is discussed with reference to system 100 of FIG. 1 and system 200 of FIG. 2 for exemplary purposes only.

In accordance with one or more techniques of this disclosure, system identification module 108 generates a perturbation sequence (1502). For example, stimuli generator 260 generates a perturbation sequence. System identification module 108 determines a perturbed duty cycle value for each phase of a converter (1504). For example, preprocessing module 262 processes a perturbed duty cycle values output by control module 206. System identification module 108 determines an output voltage of the converter (1506). For example, preprocessing module 264 processes a digital voltage output by ADC 210.

System identification module 108 generates an observation matrix based on the perturbed duty cycle values and the output voltage (1508). For example, row selection module 266 generates an observation matrix based on the perturbed duty cycle values output by preprocessing module 262 and the output voltage output by preprocessing module 264. System identification module 108 randomly selects a row of the observation matrix (1510). For example, row selection module 266 randomly selects a row of the observation matrix. System identification module 108 determines a coefficient vector based on the selected row (1512). For example, estimation module 268 determines a coefficient vector based on the selected row output by row selection module 266.

System identification module 108 estimates a natural frequency for each phase of the converter using the coefficient vector (1514). For example, tuning module 270 estimates a natural frequency for each phase of the converter using the coefficient vector. System identification module 108 tunes a controller based on the estimated natural frequency or coefficient vector for each phase of the converter (1516). For example, tuning module 270 outputs the natural frequency or coefficient vector for each phase of the converter to controller 240.

System identification module 108 estimates a phase resistance or value proportional to the phase resistance for each phase of the converter using the coefficient vector (1518). For example, tuning module 270 estimates a phase resistance or value proportional to the phase resistance for each phase of multi-phase converter 212 using the coefficient vector output by estimation module 268. System identification module 108 phase balances the converter using the phase resistance or value proportional to the phase resistance for each phase of the converter (1520). For example, tuning module 270 outputs the phase resistance for each phase of multi-phase converter 212 to phase balancer 242.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Processing circuitry of control module 106 and/or system identification module 108 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

The processing circuitry of control module 106 and/or system identification module 108 may include memory. One or more memory devices of the memory may include any volatile or non-volatile media, such as a RAM, ROM, non-volatile RAM (NVRAM), electrically erasable programmable ROM (EEPROM), flash memory, and the like.

One or more memory devices of the memory may store computer readable instructions that, when executed by the processing circuitry, cause the processing circuitry to implement the techniques attributed herein to the processing circuitry.

Processing circuitry of control module 106 and/or system identification module 108 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver switching signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A device for operating a power converter, the device being configured to: determine a set of perturbed duty cycle values for a converter, wherein a perturbation sequence is superimposed simultaneously onto a duty cycle value for each phase of the converter to form the set of perturbed duty cycle values; determine an output voltage of the converter that occurs when the converter operates based on the set of perturbed duty cycle values; determine a coefficient vector of system parameters for the converter based on the output voltage and the set of perturbed duty cycle values; and tune a controller based on the coefficient vector, wherein the duty cycle value for each phase of the converter is based on a respective command duty cycle value of a set of command duty cycle values output by the controller.

Example 2

The device of example 1, the device being configured to: estimate a set of natural frequency values for the converter based on the coefficient vector, wherein, to tune the controller, the device is configured to tune the controller based on the set of natural frequency values.

Example 3

The device of any combination of examples 1-2, wherein, to tune the controller, the controller is configured to: output the set of natural frequency values to the controller, wherein the controller is configured to determine a correction factor based on the set of natural frequency values and determine a tuned coefficient gain based on the correction factor.

Example 4

The device of any combination of examples 1-3, wherein the converter is a multi-phase converter, wherein the set of command duty cycle values is a plurality of command duty cycle values, and wherein the device is further configured to: estimate a plurality of phase resistance values or values proportional to the phase resistance values for the multi-phase converter based on the coefficient vector; and current balance each phase of the multi-phase converter based on the plurality of phase resistance values or values proportional to the phase resistance values.

Example 5

The device of any combination of examples 1-4, wherein, to current balance each phase of the multi-phase converter, the device is configured to: generate, for each phase of the multi-phase converter, a balancing value based on the plurality of phase resistance values or values proportional to the phase resistance values; and inject, for each phase of the multi-phase converter, the current balancing value onto a respective command duty cycle value of the plurality of command duty cycle values.

Example 6

The device of any combination of examples 1-5, wherein, to determine the coefficient vector, the device is configured to: generate an observation matrix based on the output voltage and the set of perturbed duty cycle values.

Example 7

The device of any combination of examples 1-6, wherein, to determine the coefficient vector, the device is configured to: randomly select a row of the observation matrix.

Example 8

The device of any combination of examples 1-7, wherein the coefficient vector is for a current switching period and wherein, to determine the coefficient vector for the current switching period, the device is configured to: multiply the randomly selected row of the observation matrix and a coefficient vector for a previous switching period to generate an estimated voltage output; subtract the estimated output voltage from the output voltage to generate an error value; multiply the error value by a correction multiplier and a transposition of the randomly selected row of the observation matrix to generate a correction vector; and subtract the correction vector from the coefficient vector for the previous switching period.

Example 9

The device of any combination of examples 1-8, wherein, to determine the coefficient vector, the device is configured to execute one or more of a batch least square algorithm, an iterative least squares algorithm, a recursive leas squares algorithm, and a dichotomous coordinate descent algorithm.

Example 10

The device of any combination of examples 1-9, comprising processing circuitry configured to: determine the coefficient vector; and tune the controller.

Example 11

The device of any combination of examples 1-10, comprising: preprocessing module configured to receive a set of unprocessed perturbed duty cycle values for the converter, wherein, to determine the set of perturbed duty cycle values, the preprocessing module is configured to preprocess the set of unprocessed perturbed duty cycle values.

Example 12

The device of any combination of examples 1-11, comprising: preprocessing module configured to receive an unprocessed output voltage for the converter, wherein, to determine the output voltage, the preprocessing module is configured to preprocess the unprocessed output voltage.

Example 13

The device of any combination of examples 1-12, comprising: an analog-to-digital converter configured to receive an indication of an analog voltage output by the converter and to generate the unprocessed output voltage.

Example 14

The device of any combination of examples 1-13, comprising: a stimuli generator configured to generate the perturbation sequence with an approximately Dirac shaped autocorrelation function.

Example 15

The device of any combination of examples 1-14, wherein the set of perturbed duty cycle values is a plurality of perturbed duty cycle values and wherein, to generate the perturbation sequence, the stimuli generator is configured to generate the perturbation sequence with a low cross correlation.

Example 16

The device of any combination of examples 1-15, wherein the converter is a single-phase converter.

Example 17

A method for operating a switching converter, the method comprising: determining, by processing circuitry, a set of perturbed duty cycle values for a converter, wherein a perturbation sequence is superimposed simultaneously onto a duty cycle value for each phase of the converter to form the set of perturbed duty cycle values; determining, by the processing circuitry, an output voltage of the converter that occurs when the converter operates based on the set of perturbed duty cycle values; determining, by the processing circuitry, a coefficient vector of system parameters for the converter based on the output voltage and the set of perturbed duty cycle values; and tuning, by the processing circuitry, a controller based on the coefficient vector, wherein the duty cycle value for each phase of the converter is based on a respective command duty cycle value of a set of command duty cycle values output by the controller.

Example 18

The method of example 17, further comprising: estimating, by the processing circuitry, a set of natural frequency values for the converter based on the coefficient vector, wherein tuning the controller comprises tuning the controller based on the set of natural frequency values.

Example 19

A system comprising: a voltage source; a converter configured to receive power from the voltage source and to generate an analog output voltage; an analog-to-digital converter configured to convert an indication of the analog output voltage into an output voltage suitable for use by a control module; a stimuli generator configured to generate a perturbation sequence; the control module comprising a controller configured to generate a plurality of command duty cycle values, the control module being configured to: generate a duty cycle value for each phase of the converter based on the plurality of command duty cycle values, wherein the perturbation sequence is superimposed simultaneously onto the duty cycle value for each phase of the converter to form a plurality of perturbed duty cycle values; and generate a switching signal based on the plurality of perturbed duty cycle values for the converter, wherein the converter generates the analog output voltage based on the switching signal; a system identification module configured to: determine the output voltage of the converter that occurs when the converter operates based on the switching signal; generate a coefficient vector of system parameters for the converter based on the output voltage that occurs when the converter operates based on the switching signal and the plurality of perturbed duty cycle values; and tune the controller based on the coefficient vector.

Example 20

The system of example 19, wherein the converter is a multi-phase converter.

Example 21

The system of any combination of examples 19-20, wherein the system identification module is further configured to: estimate a plurality of phase resistance values or values proportional to the phase resistance values for the multi-phase converter based on the coefficient vector; and current balance each phase of the multi-phase converter based on the plurality of phase resistance values or values proportional to the phase resistance values.

Various examples of the disclosure have been described. Any combination of the described systems, operations, or functions is contemplated. These and other examples are within the scope of the following claims.

What is claimed is:
1. A device for operating a switching converter, the device being configured to:
determine a set of perturbed duty cycle values for a converter, wherein a perturbation sequence is superimposed simultaneously onto a duty cycle value for each phase of the converter to form the set of perturbed duty cycle values;
determine an output voltage of the converter that occurs when the converter operates based on the set of perturbed duty cycle values;
determine a coefficient vector of system parameters for the converter based on the output voltage and the set of perturbed duty cycle values; and
tune a controller based on the coefficient vector, wherein the duty cycle value for each phase of the converter is based on a respective command duty cycle value of a set of command duty cycle values output by the controller.

2. The device of claim 1, the device being configured to: estimate a set of natural frequency values for the converter based on the coefficient vector,
wherein, to tune the controller, the device is configured to tune the controller based on the set of natural frequency values.

3. The device of claim 2, wherein, to tune the controller, the controller is configured to:
output the set of natural frequency values to the controller, wherein the controller is configured to determine a correction factor based on the set of natural frequency values and determine a tuned coefficient gain based on the correction factor.

4. The device of claim 1, wherein the converter is a multi-phase converter, wherein the set of command duty cycle values is a plurality of command duty cycle values, and wherein the device is further configured to:
estimate a plurality of phase resistance values or values proportional to the phase resistance values for the multi-phase converter based on the coefficient vector; and
current balance each phase of the multi-phase converter based on the plurality of phase resistance values or values proportional to the phase resistance values.

5. The device of claim 4, wherein, to current balance each phase of the multi-phase converter, the device is configured to:
generate, for each phase of the multi-phase converter, a balancing value based on the plurality of phase resistance values or values proportional to the phase resistance values; and
inject, for each phase of the multi-phase converter, the current balancing value onto a respective command duty cycle value of the plurality of command duty cycle values.

6. The device of claim 1, wherein, to determine the coefficient vector, the device is configured to:
generate an observation matrix based on the output voltage and the set of perturbed duty cycle values.

7. The device of claim 6, wherein, to determine the coefficient vector, the device is configured to:
randomly select a row of the observation matrix.

8. The device of claim 7, wherein the coefficient vector is for a current switching period and wherein, to determine the coefficient vector for the current switching period, the device is configured to:
multiply the randomly selected row of the observation matrix and a coefficient vector for a previous switching period to generate an estimated voltage output;
subtract the estimated output voltage from the output voltage to generate an error value;
multiply the error value by a correction multiplier and a transposition of the randomly selected row of the observation matrix to generate a correction vector; and
subtract the correction vector from the coefficient vector for the previous switching period.

9. The device of claim 1, wherein, to determine the coefficient vector, the device is configured to execute one or more of a batch least square algorithm, an iterative least squares algorithm, a recursive leas squares algorithm, and a dichotomous coordinate descent algorithm.

10. The device of claim 1, comprising processing circuitry configured to:
determine the coefficient vector; and
tune the controller.

11. The device of claim 10, comprising:
preprocessing module configured to receive a set of unprocessed perturbed duty cycle values for the converter, wherein, to determine the set of perturbed duty cycle values, the preprocessing module is configured to preprocess the set of unprocessed perturbed duty cycle values.

12. The device of claim 10, comprising:
preprocessing module configured to receive an unprocessed output voltage for the converter, wherein, to determine the output voltage, the preprocessing module is configured to preprocess the unprocessed output voltage.

13. The device of claim 12, comprising:
an analog-to-digital converter configured to receive an indication of an analog voltage output by the converter and to generate the unprocessed output voltage.

14. The device of claim 10, comprising:
a stimuli generator configured to generate the perturbation sequence with an approximately Dirac shaped autocorrelation function.

15. The device of claim 14, wherein the set of perturbed duty cycle values is a plurality of perturbed duty cycle values and wherein, to generate the perturbation sequence, the stimuli generator is configured to generate the perturbation sequence with a low cross correlation.

16. The device of claim 1, wherein the converter is a single-phase converter.

17. A method for operating a switching converter, the method comprising:
determining, by processing circuitry, a set of perturbed duty cycle values for a converter, wherein a perturbation sequence is superimposed simultaneously onto a duty cycle value for each phase of the converter to form the set of perturbed duty cycle values;
determining, by the processing circuitry, an output voltage of the converter that occurs when the converter operates based on the set of perturbed duty cycle values;
determining, by the processing circuitry, a coefficient vector of system parameters for the converter based on the output voltage and the set of perturbed duty cycle values; and
tuning, by the processing circuitry, a controller based on the coefficient vector, wherein the duty cycle value for each phase of the converter is based on a respective command duty cycle value of a set of command duty cycle values output by the controller.

18. The method of claim 17, further comprising:
estimating, by the processing circuitry, a set of natural frequency values for the converter based on the coefficient vector,
wherein tuning the controller comprises tuning the controller based on the set of natural frequency values.

19. A system comprising:
a voltage source;
a converter configured to receive power from the voltage source and to generate an analog output voltage;
an analog-to-digital converter configured to convert an indication of the analog output voltage into an output voltage suitable for use by a control module;
a stimuli generator configured to generate a perturbation sequence;

the control module comprising a controller configured to generate a plurality of command duty cycle values, the control module being configured to:
  generate a duty cycle value for each phase of the converter based on the plurality of command duty cycle values, wherein the perturbation sequence is superimposed simultaneously onto the duty cycle value for each phase of the converter to form a plurality of perturbed duty cycle values; and
  generate a switching signal based on the plurality of perturbed duty cycle values for the converter, wherein the converter generates the analog output voltage based on the switching signal;
a system identification module configured to:
  determine the output voltage of the converter that occurs when the converter operates based on the switching signal;
  generate a coefficient vector of system parameters for the converter based on the output voltage that occurs when the converter operates based on the switching signal and the plurality of perturbed duty cycle values; and
  tune the controller based on the coefficient vector.

20. The system of claim 19, wherein the converter is a multi-phase converter and wherein the system identification module is further configured to:
  estimate a plurality of phase resistance values or values proportional to the phase resistance values for the multi-phase converter based on the coefficient vector; and
  current balance each phase of the multi-phase converter based on the plurality of phase resistance values or values proportional to the phase resistance values.

* * * * *